United States Patent [19]

Worley, III et al.

[11] Patent Number: 4,958,350
[45] Date of Patent: Sep. 18, 1990

[54] ERROR DETECTING/CORRECTION CODE AND APPARATUS

[75] Inventors: Wm. Spencer Worley, III, San Jose; Eitan Fenson, Los Altos; James R. Weatherford, San Jose, all of Calif.

[73] Assignee: Stardent Computer, Inc., Sunnyvale, Calif.

[21] Appl. No.: 163,616

[22] Filed: Mar. 2, 1988

[51] Int. Cl.$^5$ .............................................. G06F 11/10
[52] U.S. Cl. .................................. 371/37.4; 371/37.1; 371/49.1
[58] Field of Search ..................... 371/37, 38, 39, 40, 371/49, 50, 51, 51.1, 49.2, 49.1, 40.4, 40.1, 21.2, 37.4, 37.1

[56] References Cited

U.S. PATENT DOCUMENTS

| | | | |
|---|---|---|---|
| 4,205,324 | 5/1980 | Patel | 371/50 |
| 4,450,562 | 5/1984 | Wacyk et al. | 371/51 |
| 4,464,747 | 8/1984 | Groudan | 371/50 |
| 4,630,272 | 12/1986 | Fukami | 371/37 |
| 4,696,007 | 9/1987 | Moriyama | 371/37 |
| 4,775,978 | 10/1988 | Hartness | 371/38 |
| 4,780,809 | 10/1988 | Woffinden | 371/40.1 X |
| 4,785,452 | 11/1988 | Petz | 371/51 X |
| 4,809,278 | 2/1989 | Kim | 371/51.1 |

FOREIGN PATENT DOCUMENTS

| | | |
|---|---|---|
| 0042966 | 5/1981 | European Pat. Off. . |
| 0070184 | 7/1982 | European Pat. Off. . |
| WO8706737 | 5/1987 | PCT Int'l Appl. . |
| 202866A | 4/1979 | United Kingdom . |

*Primary Examiner*—Jerry Smith
*Assistant Examiner*—Robert W. Beausoliel
*Attorney, Agent, or Firm*—Blakely, Sokoloff, Taylor & Zafman

[57] ABSTRACT

A method and apparatus for detection and correction of errors in binary coded information. The method involves receiving a word of binary coded information and grouping the bits of the word of information. Parity bits are generated for each of the groups of bits. The bits are grouped according to three rules: (1) for any three parity bits, there is either one data bit or no data bit whose value effects all three parity bits, (2) for any four parity bits, there is no data bit whose value effects all four, and (3) for any data bit, there are exactly three parity bits whose values are effected by its value. The word bits and parity bits are stored on memory circuits. The bits are stored on the memory circuits in accordance with three rules: (1) no memory circuit may have both data bits and parity bits stored on it, (2) for all bits on a data chip, the sets of parity bits affected by them intersect in one parity bit, (3) for all parity chips, no data bit effects the value of three bits on the chip. A second set of parity bits are generated based on bits read from memory. From this second set of parity bits it is determined whether an error has occurred and whether the error is correctable. The present invention is capable of correcting all single bit errors and detecting two-bit errors or single memory circuit failures.

33 Claims, 16 Drawing Sheets

FIG_1 (PRIOR ART)

$$\begin{array}{ccccccc|c}
\multicolumn{7}{c}{\overbrace{\hspace{5cm}}^{15}} & \overset{16}{\downarrow} \\
0 & 0 & 1 & 1 & 1 & 0 & 0 & 1 \\
0 & 1 & 0 & 1 & 0 & 0 & 0 & 0 \\
0 & 1 & 1 & 0 & 0 & 1 & 0 & 1 \\
\end{array}$$

FIG_2 (PRIOR ART)

$$\underset{1}{0} \; \underset{2}{0} \; \overset{3}{1} \; \overset{}{1} \; \overset{5}{1} \; \overset{6}{0} \; \overset{7}{0} \; \underset{8}{1} \; \overset{9}{0} \; \overset{10}{1} \; \overset{11}{0}$$
$$\phantom{0}\underset{4}{1}\phantom{0}$$

FIG_3A (PRIOR ART)

| 20<br>BINARY CODED<br>DATA WORDS | 21<br>PARITY<br>BITS |
|---|---|
| 23<br>PARITY BITS | 22<br>CHECK<br>BIT |

FIG_3B (PRIOR ART)

$$\begin{array}{c}
25 \searrow \\
\\
\\
\\
\\
\\
\\
27 \rightarrow
\end{array}
\begin{array}{ccccc|cc}
1 & 1 & 0 & 1 & 0 & 1 & \swarrow 26 \\
1 & 0 & 0 & 0 & 1 & 0 & \\
1 & 0 & 1 & 1 & 0 & 1 & \\
1 & 0 & 0 & 0 & 0 & 1 & \\
1 & 1 & 1 & 1 & 1 & 1 & \\
0 & 1 & 0 & 0 & 1 & 0 & \\
\hline
1 & 1 & 0 & 1 & 1 & 0 & \leftarrow 28 \\
\end{array}$$

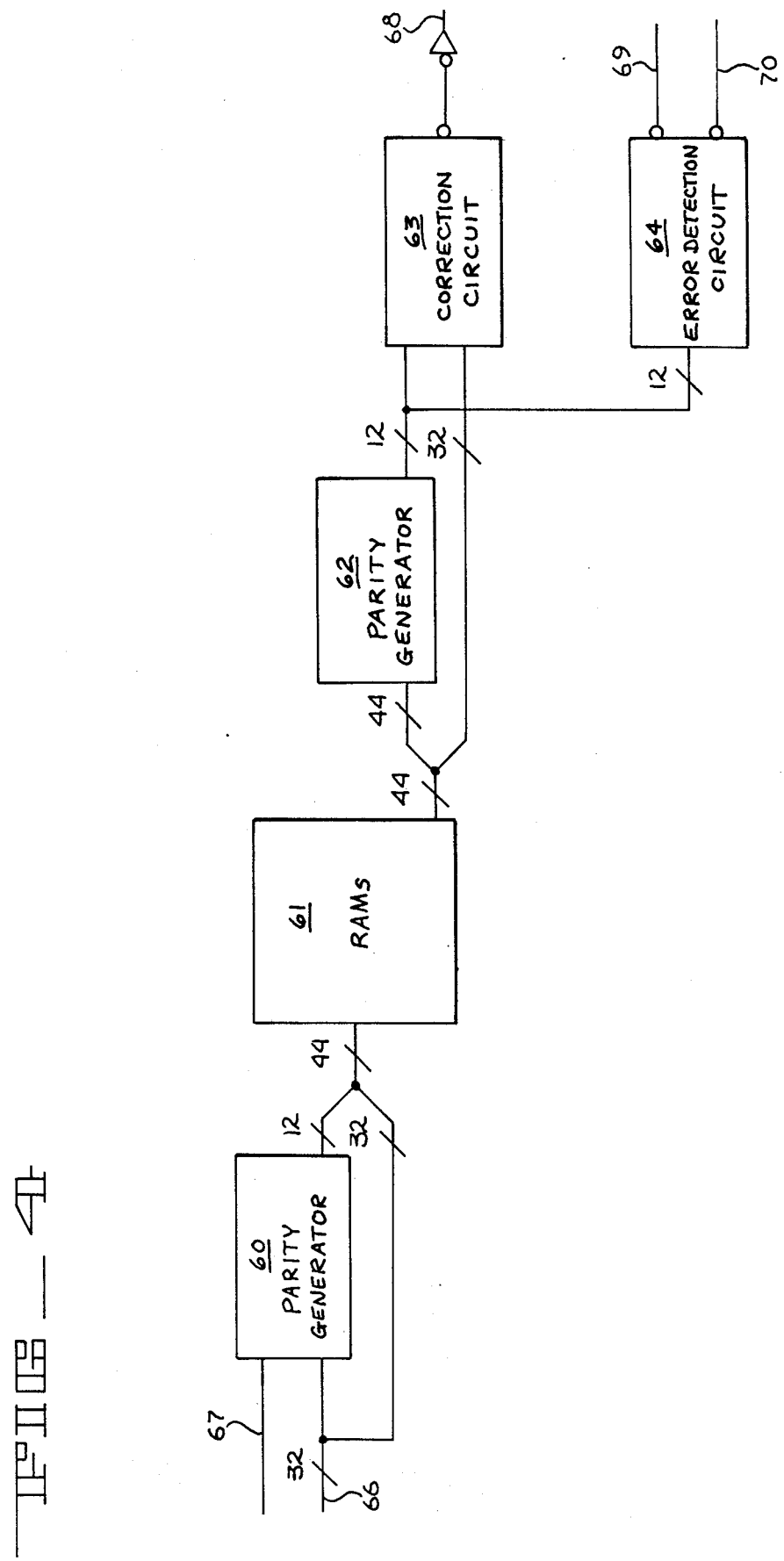

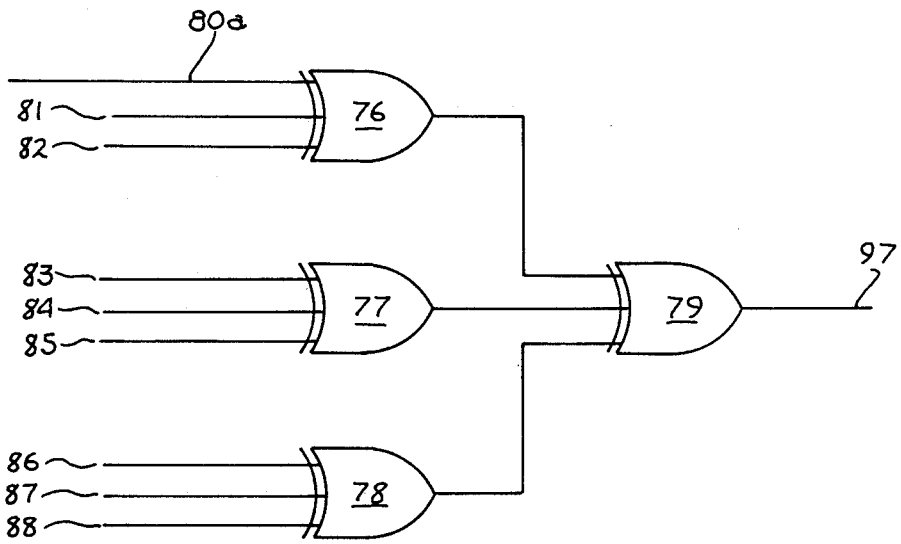
FIG_5A
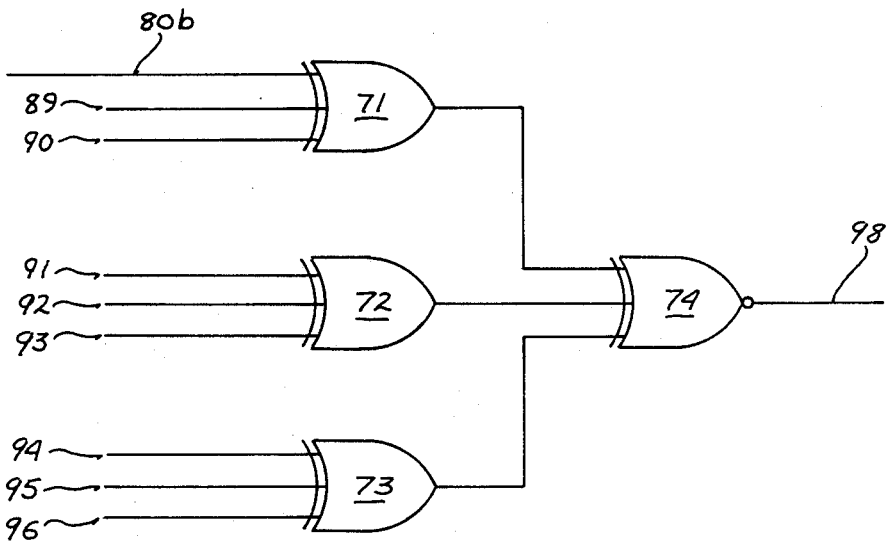
FIG_5B

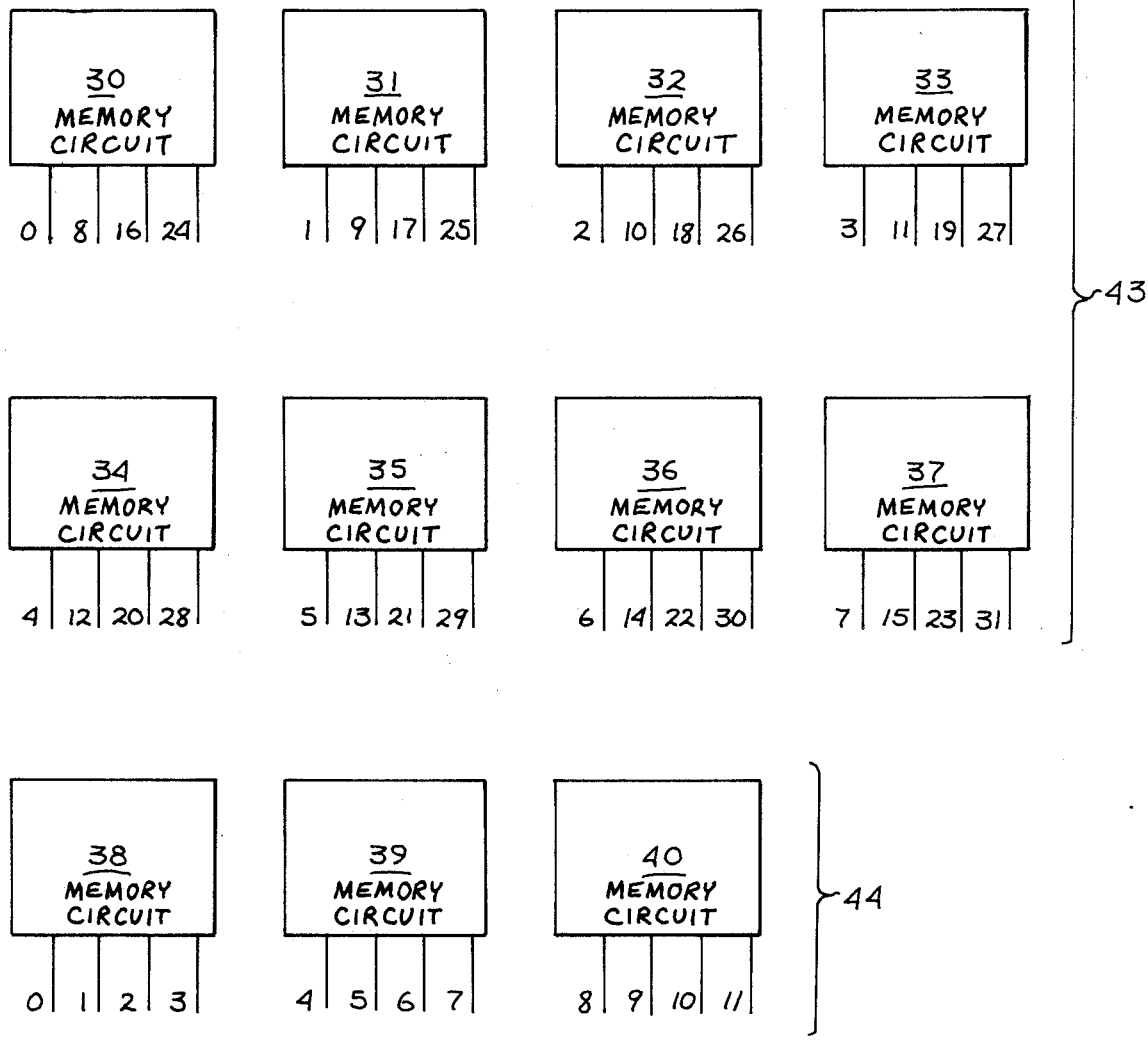
FIG_6

FIG._7A
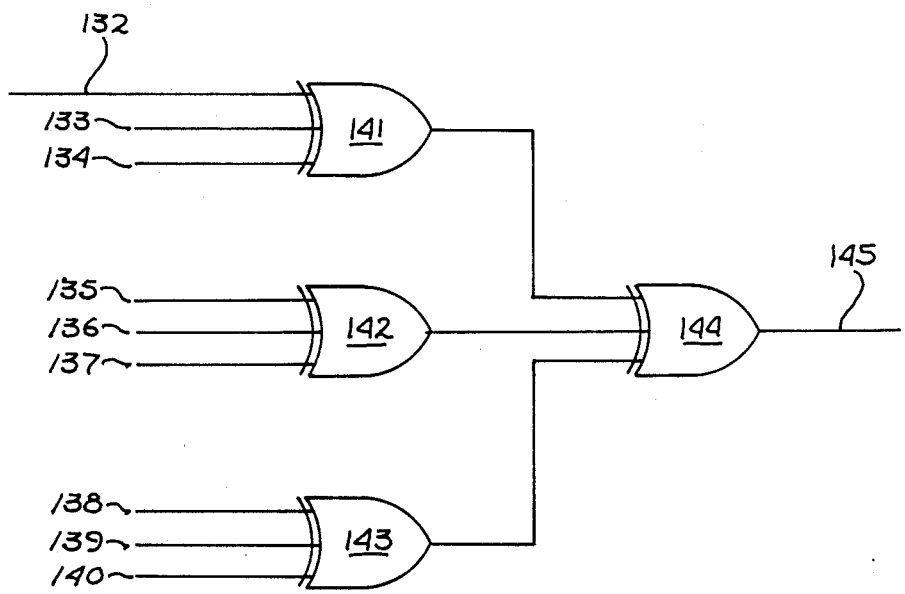
FIG._7B
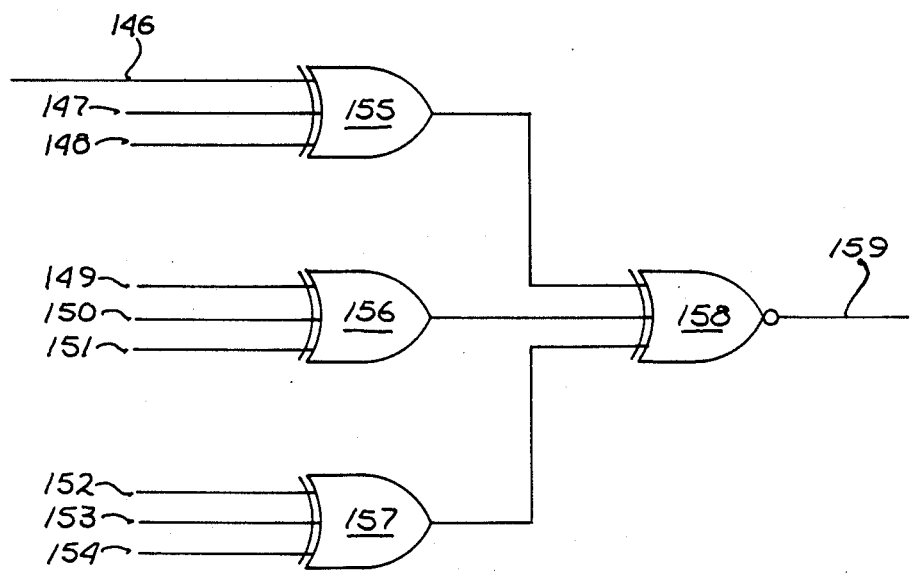

FIG. 8A
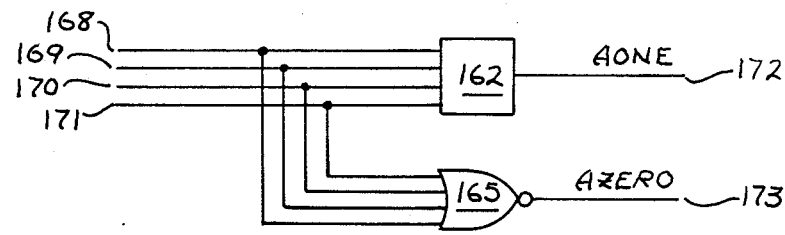
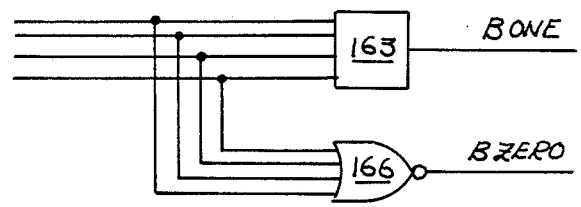
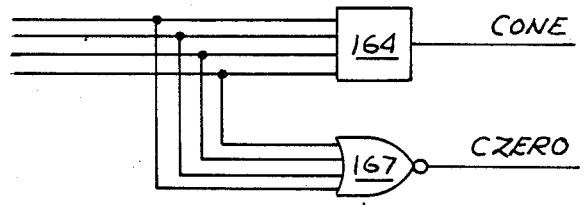
FIG. 8B
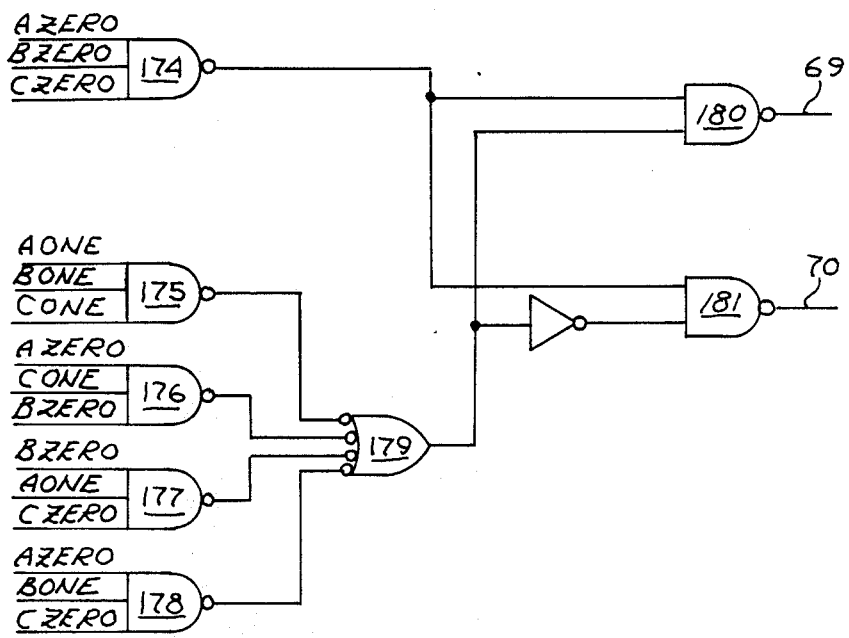

FIG_9A
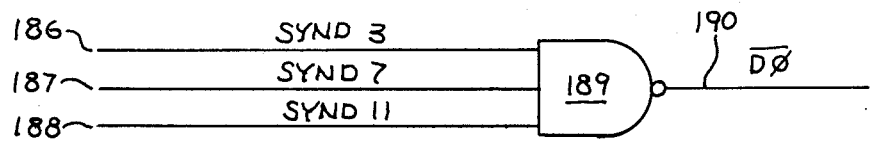
FIG_9B
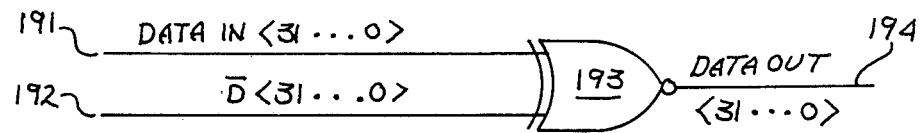

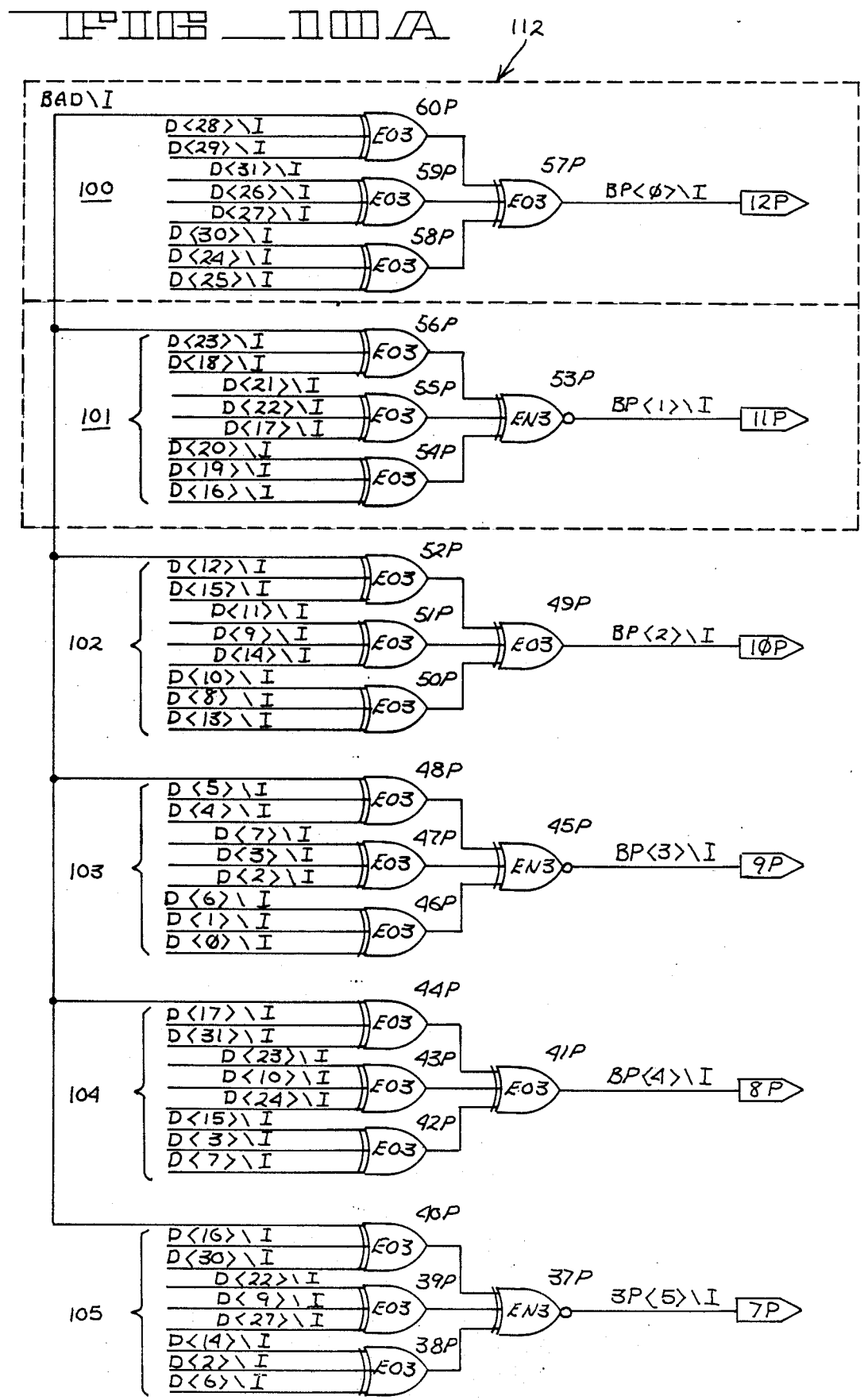
FIG_10A

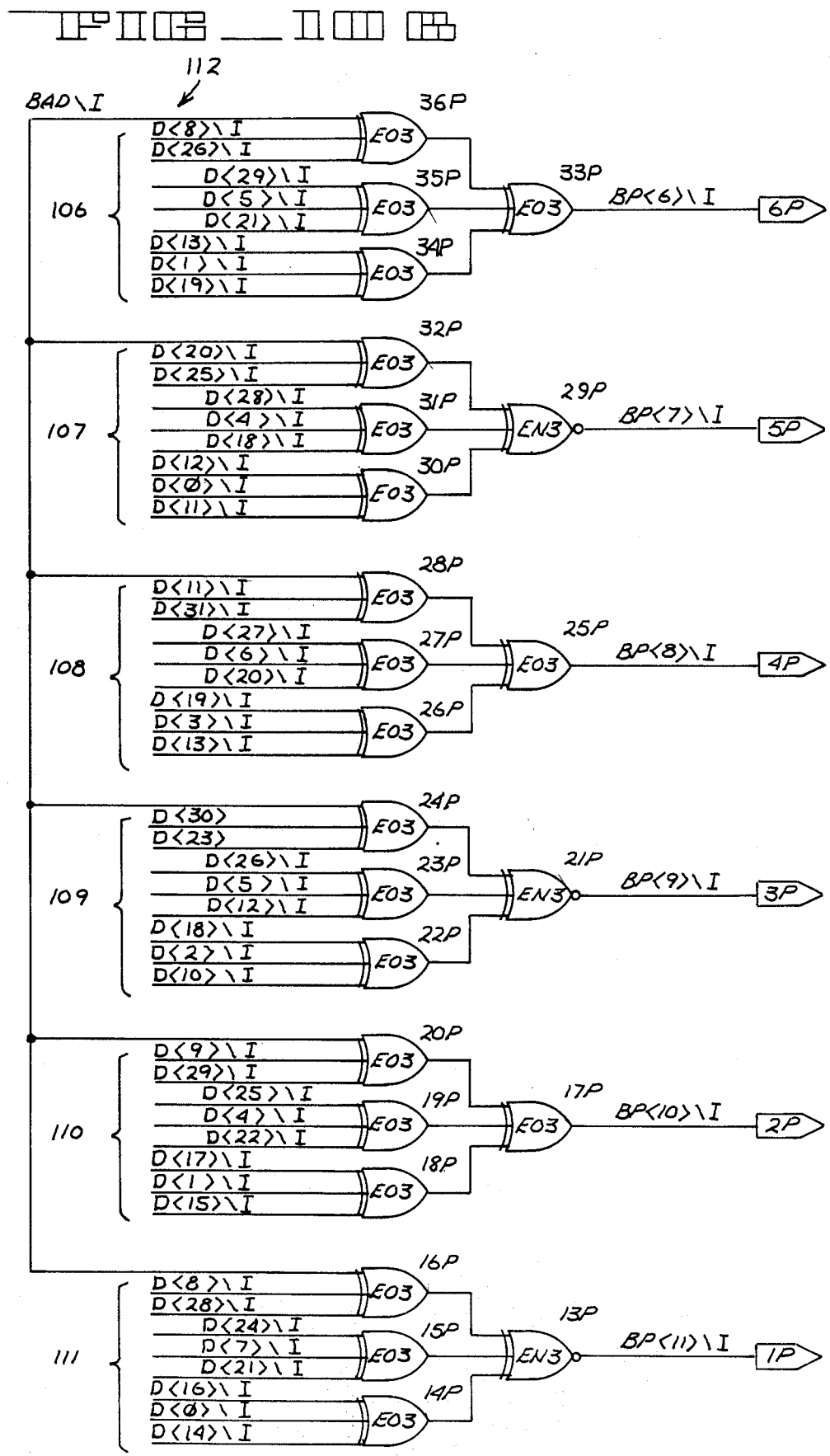
FIG_10B

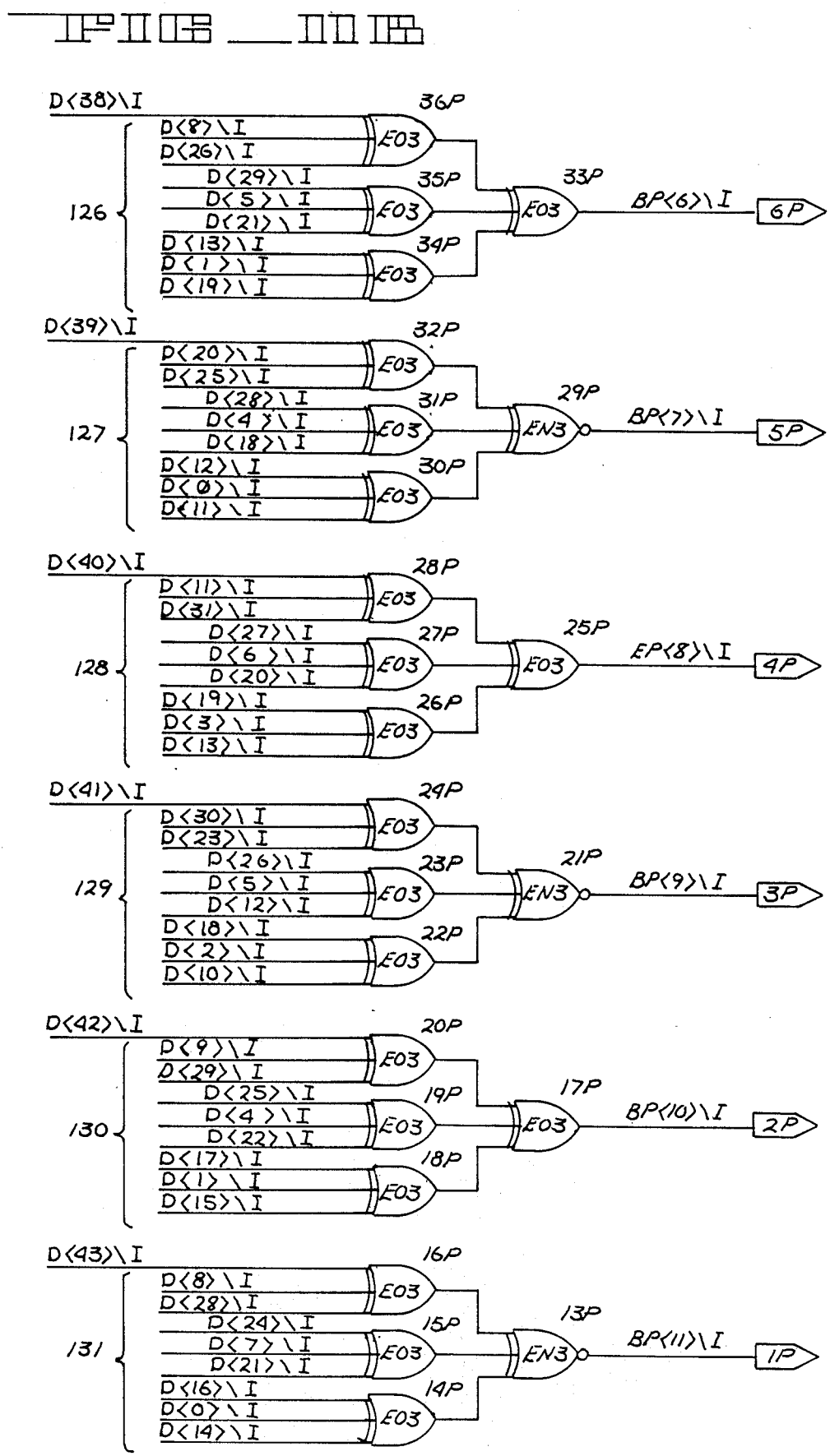
FIG._11B

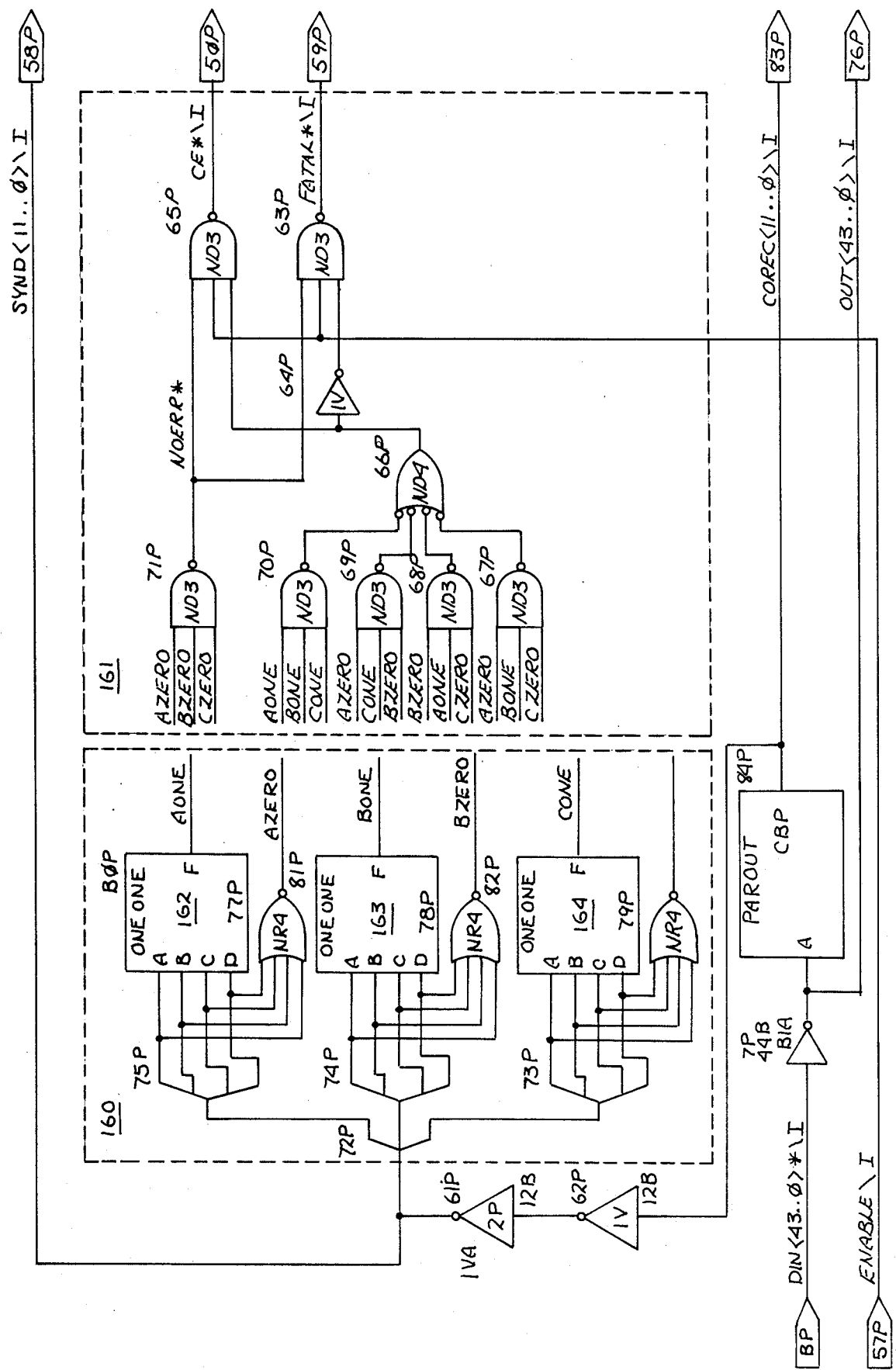
FIG_12

FIG_13A
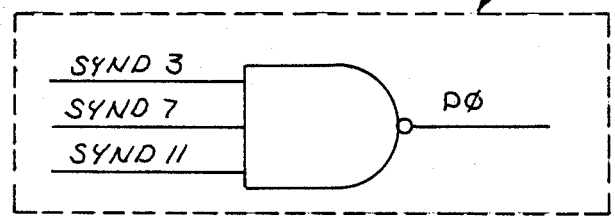
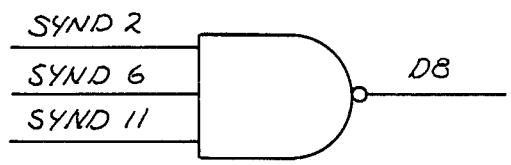
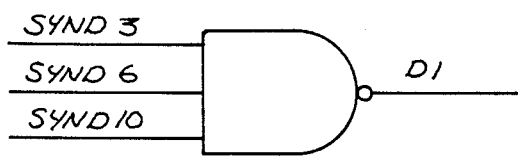
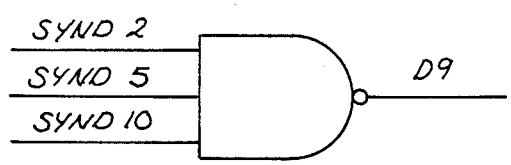
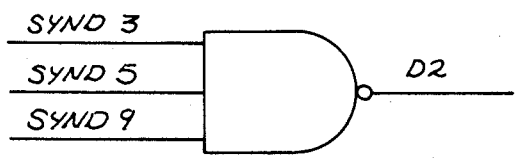
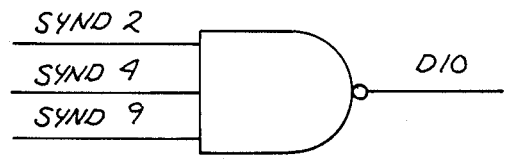
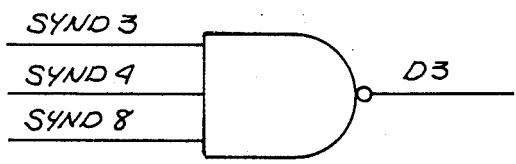
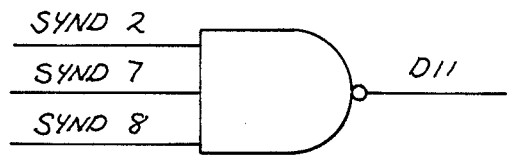
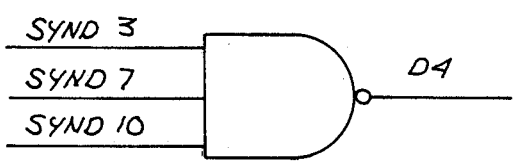
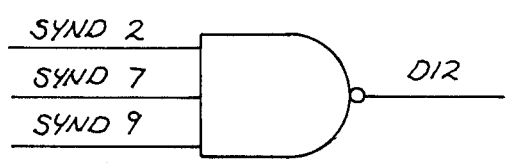
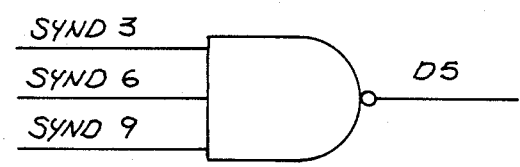
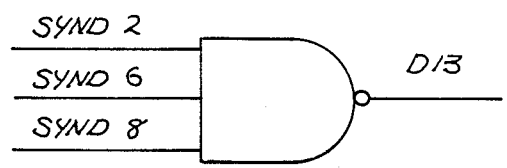
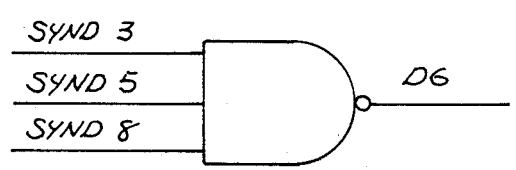
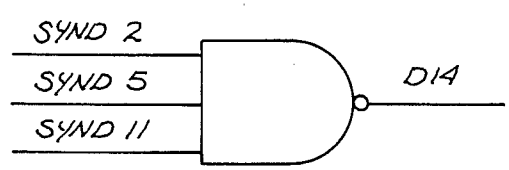
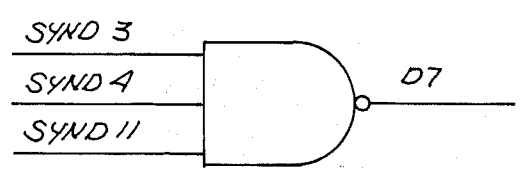
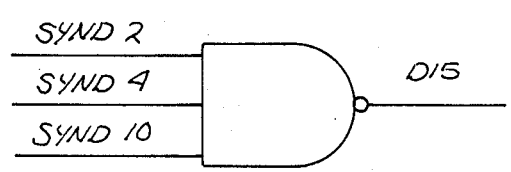

FIG_13B
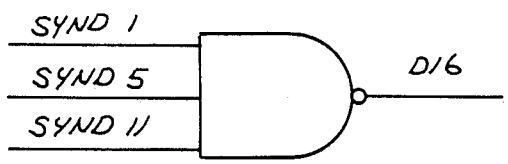
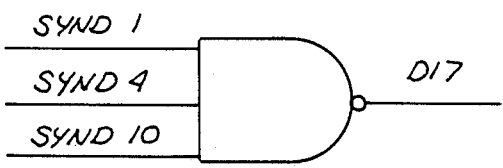
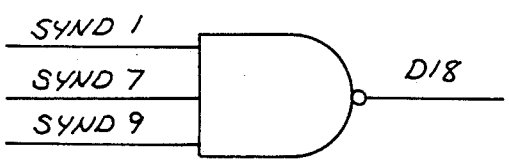
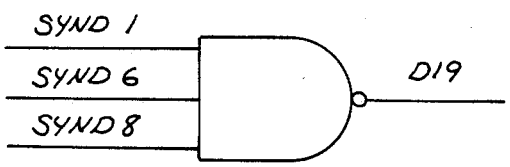
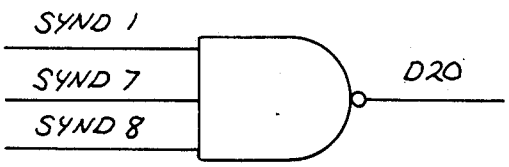
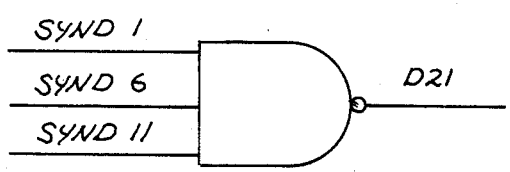
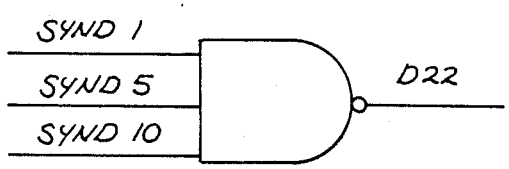
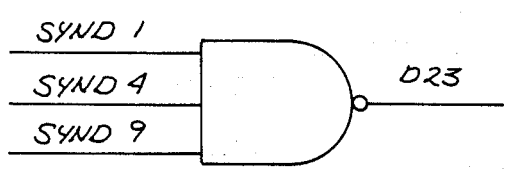
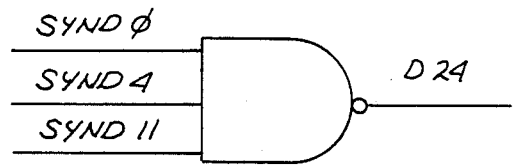
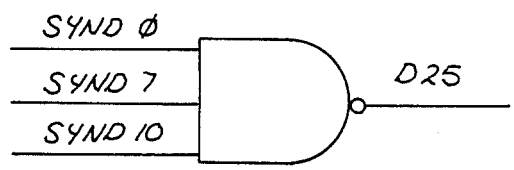
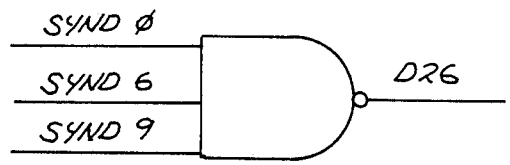
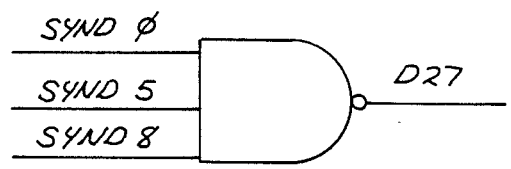
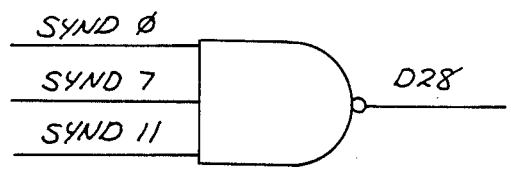
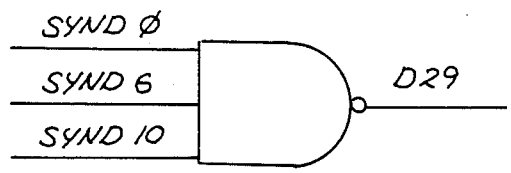
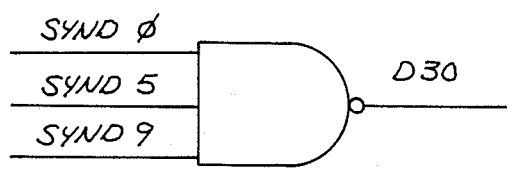
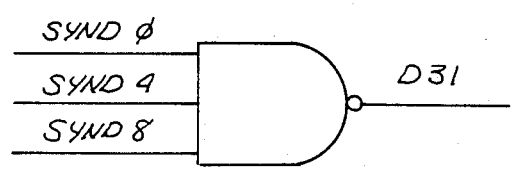

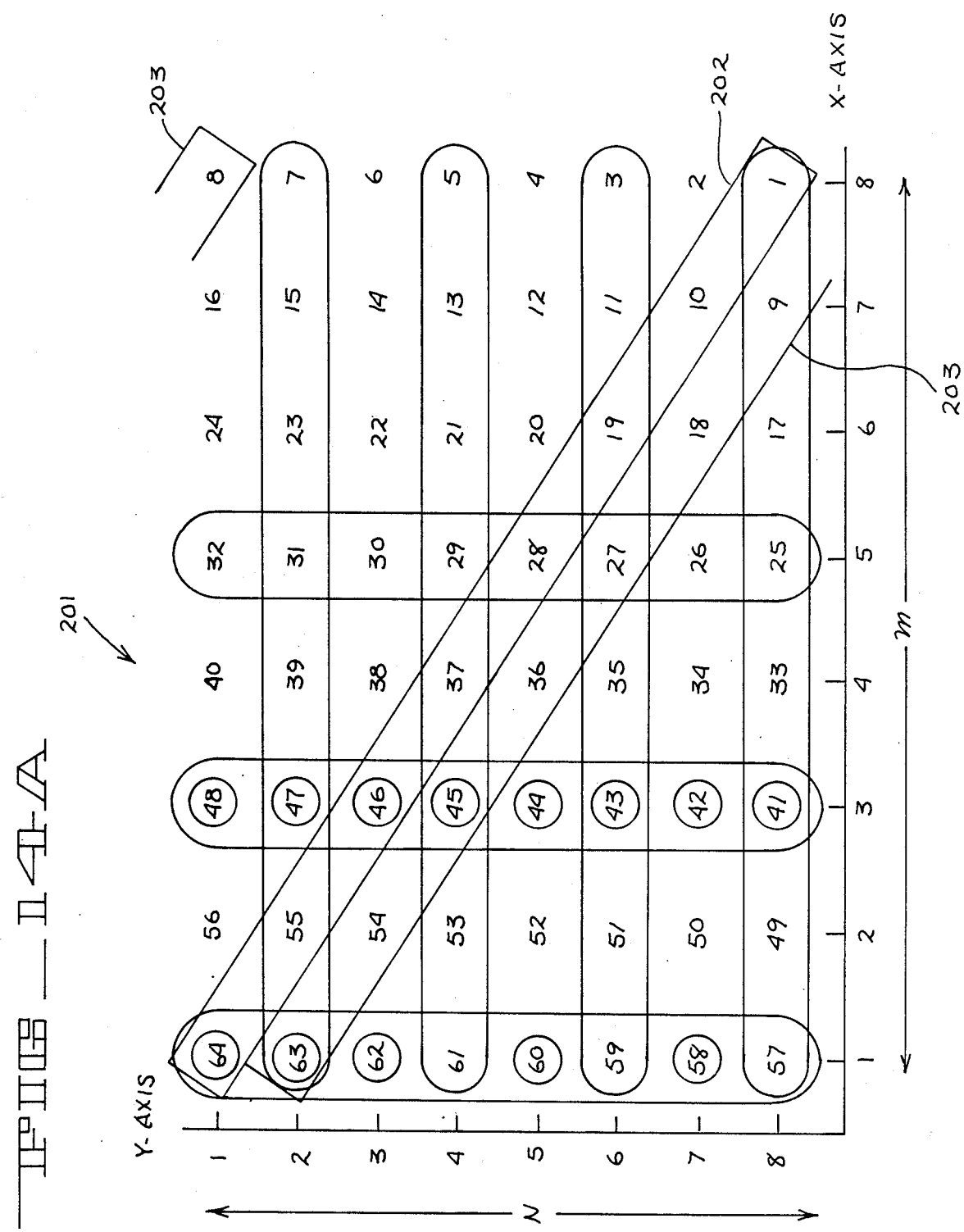

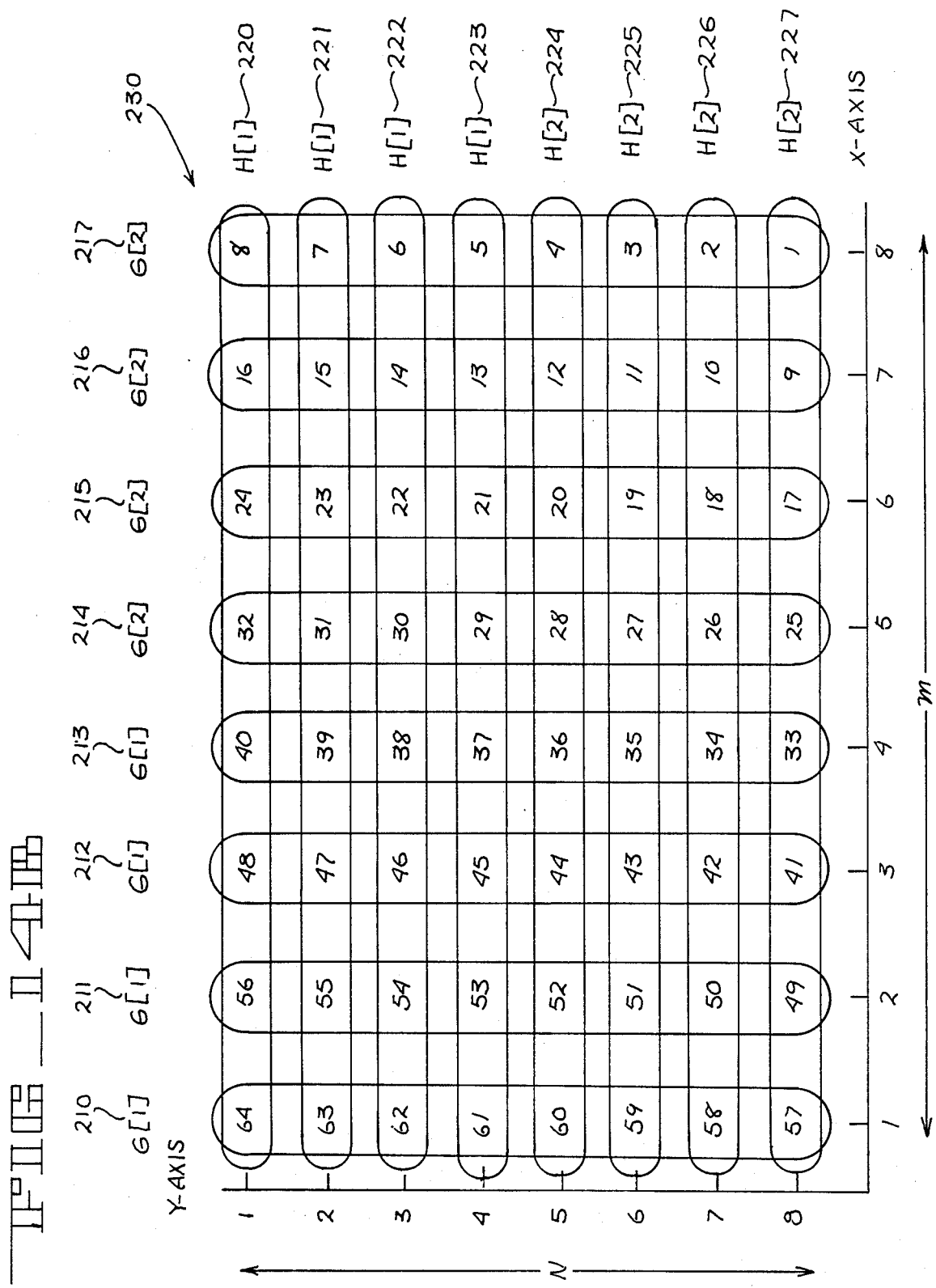
FIG_14B

ERROR DETECTING/CORRECTION CODE AND APPARATUS

BACKGROUND OF THE INVENTION

1. Field of the Invention

The present invention relates to the field of error detecting and correcting codes for computer systems.

2. Prior Art

Digital computer systems work with binary coded information wherein data is represented in the computer system as a series of pieces of information, each piece being stored as either a relatively high or relatively low electrical state. Typically, the high state is represented by a 1 and the low state is represented by a 0. Computer systems are subject to a variety of problems which may cause an electrically high state to be altered to an electrically low state or an electrically low state may be altered to an electrically high state It is important to be able to detect such errors and advantageous to be able to correct such errors. In any error checking and correcting scheme there are at least two conflicting priorities. First, the scheme must be as simple and compact as possible so as not to unduly add complexity to the system or decrease its speed. Second, the scheme should be capable of correcting as many errors as possible and detecting all expected errors Numerous examples of error checking and correcting schemes are known One of the simplest examples is the use of parity bits to detect single bit errors in a stream of data. The use of a single parity bit will detect single bit errors but is not capable of correcting single bit errors and will not detect 2-bit errors.

In 1950 Richard Hamming developed a method for detecting and correcting single bit errors. This method is known as a Hamming Code. An example of a binary coded piece of information coded using the Hamming Code method is illustrated in FIG. 2.

Another coding method is known as Product Codes. This method has numerous variations. One variation is illustrated in FIGS. 3a and 3b and utilizes an overall parity check on each row and each column in a block of data. This method is capable of detecting and correcting all single bit errors. Essentially this method amounts to computing parity bits based on a set of data and then generating a second set of parity bits based on the first set of parity bits.

SUMMARY OF THE INVENTION

A method and apparatus for detecting and correcting errors in binary coded information is disclosed. To aid in increasing the speed of a computer system, it is desirable to design a method and apparatus for detecting and correcting errors which minimizes the number of required logic levels. A method for detecting and correcting errors which generates a second set of parity bits based on a first set inherently requires at least one additional logic level.

The described method and apparatus utilizes a logic function for generating parity bits based only on the data bits. This single set of parity bits is able to allow detection and correction of errors.

Further, the preferred embodiment of the present invention is designed to work in a computer system whose memory chips are capable of having N bits read simultaneously from each chip. In such a computer system it is desirable to be able to detect any one or two bit error and any error in which any or all of the bits in a given chip are inverted. Traditionally, an "expected" error was a single or double bit error and it was unlikely to have more than a double bit error. The assumption of unlikelihood for more than a double bit error is acceptable in a "by-one form factor" scheme in which a single bit is read out of each chip in each cycle. However, in a computer system utilizing a "by N form factor" scheme, i.e. having chips which are capable of allowing N bits to be read from them simultaneously, there is increased likelihood of a single chip failure causing more than a 2-bit error.

The present invention is capable of correcting any "simple" error, a simple error being defined as an error in which any one bit is inverted. The present invention will also detect any "expected" error, defined as an error in which any two bits are inverted or any or all bits read from a given chip are inverted. The present invention discloses generation of check or parity bits based on the data input and discloses storing the data and check bits such that: (1) no chip contains both data and check bits, (2) for all bits on a data chip, the sets of check bits whose values are affected by those bits all intersect in one distinguished check bit, (3) for all check bit chips, there is no data bit whose value is affected by the values of three bits on the chip. The preferred embodiment of the present invention has arranged bits such that for any three check bits, there is either one data bit or no data bit whose value affects all three. Second, for any four check bits, there is no data bit whose value of affects all four. Third, for any data bit, there are exactly three check bits whose values are affected by its value.

Essentially, the preferred embodiment of the present invention discloses an arrangement of check bits and data bits on chips such that the check bits represent a value which when associated with eight of the data bits causes the parity of the resulting 9-bit word to be even. The eight data bits are chosen in accordance with the rules previously stated.

Five separate circuits utilized by the present invention are described; a circuit for generating the appropriate parity bits when the data is received to be stored in the memory, the memory circuits, a circuit for generating the appropriate parity bits for checking the correctness of data as it is read from the memories, a circuit for determining whether a correctable or an uncorrectable error has been detected, and a circuit for correcting errors.

The present invention assures that any "simple" error is corrected and any "expected" error is detected when reading data from a by-n form factor memory circuit.

BRIEF DESCRIPTION OF THE DRAWINGS

FIG. 1 illustrates a prior art method of using parity bits to detect errors in a binary code.

FIG. 2 illustrates a prior art method of using a Hamming Code to detect errors in a binary code.

FIG. 3(a) is a block diagram illustrating a prior art method of using a Product Code to detect and correct errors in a block of binary coded words.

FIG. 3(b) illustrates an example of the use of a Product Code to detect and correct errors in a block of binary coded words.

FIG. 4 is a block diagram illustrating circuits as utilized by the present invention.

FIG. 5(a) is a circuit diagram illustrating a parity generation circuit as used to generate a parity bit utilized by the present invention when data is input to memory.

FIG. 5(b) is a circuit diagram illustrating a circuit used to generate a parity bit as utilized by the present invention when data is input to memory.

FIG. 6 is a block diagram illustrating memory circuits as utilized by the present invention.

FIG. 7(a) is a circuit diagram illustrating a circuit used to generate a parity bit as words are read from memory as utilized by the present invention.

FIG. 7(b) is a circuit diagram used to generate a parity bit as words are read from memory as utilized in the present invention.

FIG. 8(a) is a circuit diagram illustrating a circuit used in detecting whether an error may be corrected as utilized by the present invention.

FIG. 8(b) is a circuit diagram illustrating a circuit used in determining whether an error may be corrected as utilized by the present invention.

FIG. 9(a) is a circuit diagram illustrative of a circuit used in determining whether a bit read from memory is in error as may be utilized by the present invention.

FIG. 9(b) is a circuit diagram illustrative of a circuit used to correct errors in a bit as it is read from memory as may be utilized by the present invention.

FIGS. 10(a) and 10(b) are a circuit diagram illustrating circuits for generating parity bits when data is input to memory as may be utilized by the present invention.

FIGS. 11(a) and 11(b) are a circuit diagram illustrating circuits for generating parity bits when data is read from memory as may be utilized by the present invention.

FIG. 12 is a circuit diagram illustrative of a circuit used to correct errors in words of data as they are read from memory as may be utilized by the present invention.

FIG. 13 is a circuit diagram illustrating circuits for correcting bits in words as they are read from memory as may be utilized by the present invention.

FIGS. 14(a) and 14(b) are bit matrices illustrative of a method of grouping data bits, as may be utilized by the present invention.

DETAILED DESCRIPTION OF THE PRESENT INVENTION

Figure 11A:
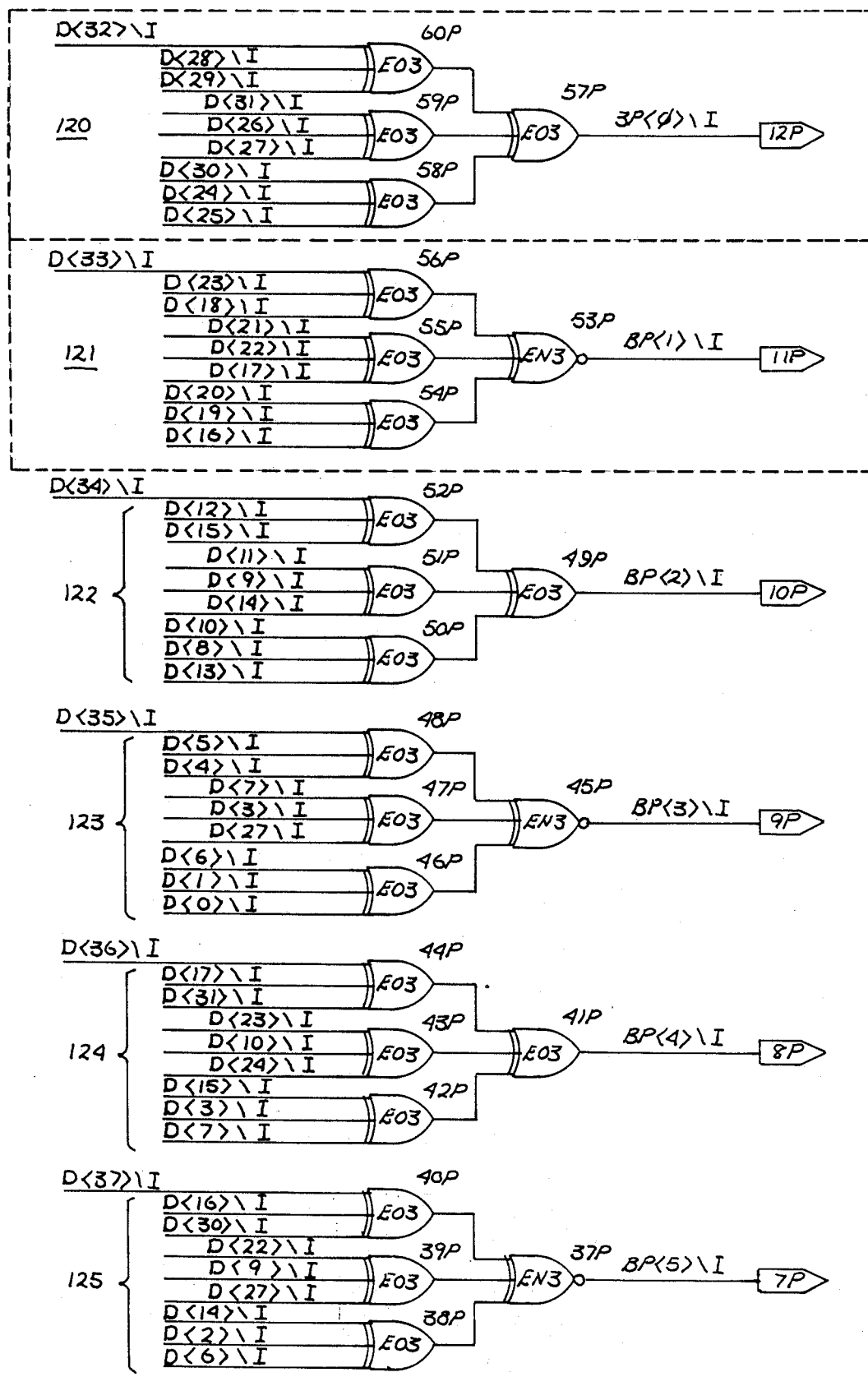

A method and apparatus for detecting and correcting errors in binary coded information is disclosed. In the following description, numerous specific details are set forth such as types of gates, bit numbers, etc., in order to provide a thorough understanding of the present invention. It will be obvious, however, to one skilled in the art that the present invention may be practiced without these specific details. In other instances, well known circuits and structures have not been shown in detail in order not to unnecessarily obscure the present invention.

In computer systems information is typically stored and transmitted in a binary coded form. Due to a variety of causes it is possible that one or more of the binary bits of information may become inverted. The present invention is capable of detecting and correcting the inversion of a single bit in a piece of information and is capable of detecting the inversion of two bits in a piece of information.

Further, the present invention accomplishes the error detection and correction through use of a set of parity bits. The parity bits are generated as a function of only the data bits using a logic function in the computer system circuitry. This is significant with regard to the speed of the computer system especially when compared with error correction and detection schemes which generate a first set of parity bits as a function of the data and a second set of parity bits as a function of the first set of parity bits.

The preferred embodiment of the present invention accomplished detection and correction of errors by having three parity bits generated as a function of each data bit. As will be explained in more detail below, the present invention discloses grouping of the data bits such that each data bit is a member of three groups and each group has a parity bit generated for it. This scheme offers the advantage of error detection and correction using fewer logic levels than known methods of generating a first set of parity bits based on the data and a second set based on the first set.

In addition, the present invention is capable of detecting the inversion of any number of bits which are stored on the same memory circuit. This is important where bits are read from a memory circuit n-bits at a time. In this case, a single circuit failure will lead to corruption of multiple bits. The present invention discloses a method of organizing the data bits and generating parity bits for those data bits.

Circuitry for generating the parity bits from the input data, memory circuits, circuitry for generating parity bits as data is read from memory, circuitry for determining whether an error has occurred and determining whether the error is correctable, and circuitry for correcting correctable errors is disclosed.

PRIOR ART METHODS

FIG. 1 illustrates a well known method of using parity bits 16 to detect errors in a binary coded word 15. This method involves use of either even parity or odd parity, the choice of type of parity chosen and agreed to between two communicating devices. For example, in even parity the value of the parity bit is chosen such that the total number bits or 1s in the wording including the parity bit is an even number. Conversely, in odd parity the value of the parity bit is chosen such that the total number of 1s in the binary coded word including the parity bit is odd. The parity bit is generated either before transmitting the word to another device or before storing the word in a memory. When the other device receives the word or when the word is read from memory, a check is done to insure that the total number of 1s in the word is even for an even parity system or odd for an odd parity system. In an even parity system, for example, if the number of 1s in the word is odd the system assumes that there has been an error and typically requests for retransmission of the word. The use of parity bits alone allows for detection of single bit errors but does not allow for correction of errors or detection of 2-bit errors.

FIG. 2 is illustrative of a well known method of detecting and correcting single bit errors in a binary coded word. This method was developed by Richard Hamming and first disclosed in 1950. It is known as a Hamming Code. It utilizes multiple parity bits to allow for detection and correction of errors. In a Hamming Code, K parity bits are added to an N-bit word, forming a new word of length and N+K bits. The bits are numbered starting at 1, not 0, with bit 1 the left most bit. All bits whose bit number is a power of 2 are parity bits, and all the remaining bits are used for data.

As illustrated in FIG. 2, for a 7-bit ASCII word parity bits 1, 2, 4 and 8 are added. Bits 3, 5, 6, 7, 9, 10 and 11 are the 7 data bits. In the 7-bit ASCII word represented using a Hamming Code and utilizing even parity as illustrated in FIG. 2, bit 1 is a parity bit used to check bits 1, 3, 5, 7, 9 and 11. Bit 2 checks bits 2, 3, 6, 7, 10 and 11. Bit 4 checks bits 4, 5, 6 and 7. Bit 8 checks bits 8, 9, 10 and 11. In general, bit N is checked by those bits $B_1$, $B_2, \ldots, B_k$ such that $B_1 + B_2, \ldots + B_k = N$. For example, bit 5 is checked by bits 1 and 4 because $1+4=5$, bit six is checked by bits 2 and 4 because $2+4=6$, etc. As stated above, a Hamming Code is capable of detecting and correcting single bit errors. A Hamming Code will not guarantee detection of more than a single bit error.

FIG. 3(a) and FIG. 3(b) illustrate a well known method of grouping a set of binary coded words into a single block of words and applying one of the known methods of producing parity bits for each row (or word in the block) and for each column. For example, in FIG. 3(a) block 20 may represent the block of words in a binary coded format. Block 21 may then represent a column of parity check bits for each word in the block 20. Block 23 may represent a parity check bit for each column in block 20. Block 22 may then represent a parity check bit for the column 21 and the row 23.

FIG. 3(b) illustrates an example of a Product Code using this method. Area 25 represents the binary coded words, area 26 is the column of parity check bits using an even parity scheme for each word in the block 25. Row 27 represents parity check bits, again using an even parity scheme, for each column in the block 25. Parity bit 28 is a check bit for column 26 and row 27 and, again, uses an even parity bit scheme. This method of using a Product Code utilizing a simple parity check on the rows and columns of binary coded words in a block is capable of correcting all single bit errors. If a single bit error occurs, the row and column in which it occurs are indicated by parity check failures. The method cannot guarantee detection of more than a single bit error.

The present invention relates to a method and apparatus for error correction and detection in a computer system which utilizes random access memories (RAMs) which are more than one bit wide (i.e. RAMs which are capable of storing and allowing reading of more than one bit during a given memory cycle). The present invention has the following properties:

| 2 | (1) | any single bit error is detectable and correctable; |
| 3 | (2) | any double bit error is detectable; and |
| 4 | (3) | any single device (RAM) may fail and produce any combination of erroneous results and such a failure will be detectable. |

The present invention discloses a set of criteria for associating data bits with check bits. The criteria consists of three rules:

(1) for any three parity bits there is either one data bit or no data bits whose value affects all three;

(2) for any four check bits, there is no data bit whose value affects all four; and (3) for any data bit, there are exactly three check bits whose value are affected by its value.

The present invention discloses a method for choosing how to associate parity bits with check bits in accordance with the above rules and for mapping the bits into physical devices (RAMs) in a manner which meets the above requirements. In general, check bits are generated by taking the boolean Exclusive Or (XOR) or Exclusive Nor (XNOR) of a set of associated data bits. XORs and XNORs are alternated for check bits which are stored on the same check bit chip.

When bits are returned from the RAMs, they must be examined to determine if there is an error. If there is an error, it must be determined whether this error is correctable. To determine whether the error is correctable, a syndrome bit is generated for each check bit from the information returned by the RAMs. If the check bit was generated by the XOR of its associated data bits, the syndrome bit is generated by taking the XOR of the check bit and its associated data bits. If the check bit was generated from the XNOR of its associated data bits, the syndrome bit is generated by taking the XNOR of the check bit and its associated data bits. Thus, the syndrome bit generated will be zero in the case of no error. If all syndrome bits generated from a data word and its check bits are zero, there is no error present in the data. If there is exactly one syndrome bit which is a one, then there has been a one bit error in the check bits and the data can be used unchanged. If three syndrome bits are one and if sets of data bits are associated with these three check bits intersect in exactly one data bit, then there has been a correctable data error. The data is then corrected by inverting the intersected data bit. Any other combination of syndrome bits being equal to one is an uncorrectable error.

As a general method of organizing data on circuits, determining grouping of data bits and detecting errors, the following steps may be utilized. As an example, assume the system of reference is a 64-bit system. The first step is to arrange the data bits in a twodimensional array. The number of rows in the array is determined from the data width by the following equation.

$x = \log_2$ (data width)
$y = (x/2)$ rounded up to the nearest integer
number of rows $= 2^Y$
number of columns $= 2^{(x-y)}$ or specifically:
$x = \log_2 64 = 6$
$y = (6/2) = 3$
number of rows $= 2^3 = 8$
number of columns $= 2^{(6-3)} = 2^3 = 8$ The data bits may then be laid out in an M×N array 201 of FIG. 14(a), where M is the number of rows and N is the number of columns. Each position in the array represents one data bit and the data bits may be organized in any order. For purposes of illustration, the data bits are organized with data bit number one in the lower righthand corner of the array and continuing consecutively upward and to the left with data bit 64 in the upper lefthand corner of the array 201.

The data bits are grouped by drawing parallel diagonals through the array such as diagonals 202 and 203. Each diagonal will have N bits. The first diagonal 202 is defined as $\{(X[1], Y[1]), (X[2],Y[2]),\ldots, (X[N],Y[N])\}$. The second diagonal 203 is defined as $\{(X[1],Y[2]), (X[2],Y[3]),\ldots, (X[N],Y[N+1])\}$. When grouping the diagonals, when (X[i], Y[j]) is reached such that j>M, bit (X[i], Y[j−M]) is used as the next bit in a grouping so that diagonals wrap around the array. In general, the diagonals may be defined as $\{(X[1],Y[Q]), (X[2],Y[Q+1]),\ldots,(X[N],Y[Q+N])\}$ where Q is the diagonal number. There are now defined M diagonal groups which may be referred to as A[1],A[2],...A[M].

A second set of diagonal bits are formed which are perpendicular to the first set of diagonal bits. The first diagonal 204 of the second set is defined as {(X[N],Y[1]), (X[N−1],Y[2]),,, (X[1],Y[N])}. The second diagonal 205 is defined as {(X[N],Y[2]), (X[N−1],Y[3]),,, (X[1],Y[N+1])}. When (X[i],Y[j]) is reached such that j>M bit, (X[i],Y[j−M]) is used as the next bit in a grouping so that the diagonals wrap around the array. In general, diagonals may be defined {(X[N],Y[Q]), (X[N−],Y[Q+1]),,, (X[1],Y[Q+N])}, where Q is the diagonal number. The second set of diagonal groups may be referred to as B[1],B[2],,, B[M].

There are now defined 2×M sets of N bits such that each data bit is intersected by exactly two groups.

The diagonal groups are then evaluated to determine grouping for generation of parity bits. Each parity bit will cover (word width/RAM width) data bits. In the above example, assume an individual RAM may store 4 bits of information and word width is 64 bits. Therefore, each parity bit will cover 64/4 data bits or 16 bits. Each parity bit will cover (word width/(RAM width×N)) diagonal groups or, in the above example (64/(4×8))=64/32=2 groups.

In general, if each parity bit covers one diagonal, the individual diagonals A[1],A[2],,,A[M] and B[1],B[2],,, B[N] are used to generate the parity bits. If each parity bit covers two diagonals as in the example, the diagonals are grouped such that C[i]=union of A[i] and B[i]. If each parity bit covers four diagonal groups, groups C[i] are first generated as the union of A[i] and B[i], as discussed above. Groups D[i] are generated as the union of A[N+i] and B[N+i] for i=1 to N. Parity bits are then associated with groups E[i], groups E[i] being generated as the union of C[i] and D[i] for i=1 to N.

For a system with RAM width=R, data bit groupings for generation R more parity bits must be defined. This is done by utilizing the following procedure. First, the columns in the array of data bits are divided into two groups, G[1] and G[2] such that:

G[1]={(X[1],Y[1..M]),(X[2],Y[1..M]),,,(X[N/2], Y[1..M])}, and

G[2]={(X[(N/2)+1],Y[1..M]),(X[(N/2N/2)+2], Y[1..M]),,,(X[(N/2)+(N/2)],Y[1..M])}

The rows are divided into R/2 groups H[i], where R=the RAM width, such that:

H[1]={(X[1..N],Y[1]),(X[1..N},Y[2]),,, (X[1..N],Y[2×1×M/R])} and generally, for i=2 to R/2:

H[i]={(X[1..N],Y[((i−1)×(2×M/R))+1]), (X[1..N],Y[((i−1)×(2×M/R))+2]),,,(X[1..N], Y[((i−1)×(2×M/R))+(2×M/R)])}

The data bits for computing the remaining parity bits are formed by the inter section of the G[1],G[2] and H[i] groups, such that:

F[i]=the intersection of G[1] and H[i] for i=1 to R/2
F[i+(R/2)]=the intersection of G[2] and H[i] for i=1 to R/2

This yields R groups of data bits for generation of parity bits.

The next step is to determine which bits are stored in which physical devices. The data bits and parity bits are stored in separate devices. Each device stores R bits. The first check bit chip stores check bits generated by F[1..R]. If W=1, the second chip is filled with the check bits generated by data bits A[1..R] and the third chip is filled with the check bits generated by data bits B[1..R]. If W=2, the second check bit chip is filled with the check bits generated by C[1,3,5..(2×R−1)] and the third is filled with the check bits generated by C[2,4,6..(2×R)]. If W=4, the second check bit chip is filled with the check bits generated by E[1,3,5,..(2×R−1)] and the third is filled with the check bits generated by E[2,4,6..(2×R)].

The diagonal groups of data bits A[1..M] are used to determine the storing arrangement of data bits on chips. Each diagonal group will have R or some integer multiple Z×R data bits. Each of the data bits from the data bits A[1..M] diagonal groups are stored on Z data chips. Data bits from any given diagonal group may be stored on data chips in any order.

FIG. 4 illustrates the four main components of the preferred embodiment of the present invention. The present invention stores data in RAMs 61, the layout of these RAMs will be more fully explained in connection with FIG. 6. Data to be stored in these RAMs is input on line 66 and in the preferred embodiment is 32-bits wide. The 32-bits of data are input into a parity generator 60. The circuitry in the parity generator 60 will be more fully explained in connection with FIG. 5(a), FIG. 5(b) and FIG. 10. The output from the parity generation circuit 60 is 12 parity bits generated according to the function set forth below. In the below function equations BPn indicates the value of the byte parity bit where n is 0–11 representing the 12 bits output from the parity generation circuit 60. XOR as used in the specification represents an Exclusive OR function.

| | |
|---|---|
| BP0 = | 31 XOR 30 XOR 29 XOR 28 XOR 27 XOR 26 XOR 25 XOR 24 |
| BP1 = | NOT ( 23 XOR 22 XOR 21 XOR 20 XOR 19 XOR 18 XOR 17 XOR 16 ) |
| BP2 = | 15 XOR 14 XOR 13 XOR 12 XOR 11 XOR 10 XOR 9 XOR 8 |
| BP3 = | NOT ( 7 XOR 6 XOR 5 XOR 4 XOR 3 XOR 2 XOR 1 XOR 0 ) |
| BP4 = | 31 XOR 23 XOR 15 XOR 7 XOR 24 XOR 17 XOR 10 XOR 3 |
| BP5 = | NOT ( 30 XOR 22 XOR 14 XOR 6 XOR 27 XOR 16 XOR 9 XOR 2 ) |
| BP6 = | 29 XOR 21 XOR 13 XOR 5 XOR 26 XOR 19 XOR 8 XOR 1 |
| BP7 = | NOT ( 28 XOR 20 XOR 12 XOR 4 XOR 25 XOR 18 XOR 11 XOR 0 ) |
| BP8 = | 27 XOR 19 XOR 11 XOR 3 XOR 31 XOR 20 XOR 13 XOR 6 |
| BP9 = | NOT ( 26 XOR 18 XOR 10 XOR 2 XOR 30 XOR 23 XOR 12 XOR 5 ) |
| BP10 = | 25 XOR 17 XOR 9 XOR 1 XOR 29 XOR 22 XOR 15 XOR 4 |
| BP11 = | NOT ( 24 XOR 16 XOR 8 XOR 0 XOR 28 XOR 21 XOR 14 XOR 7 ) |

The 12 parity bits generated from the parity generation circuit 60 and the 32 data bits are input to the memory 61. Reading data from the memory 61 involves reading the 44-bits from the memory and inputting the 44 bits into a second parity generation circuit 62. The circuitry involved in the parity generation circuit 62 is more fully described in connection with FIG. 7(a), FIG. 7(b) and FIG. 11. The parity generation circuit 62 generates parity bits according to the function set forth below. This specification will refer to these parity bits as syndrome bits and the function equations below identify each syndrome bit with the term SYNDn.

| | |
|---|---|
| SYND0 = | BP0 XOR 31 XOR 30 XOR 29 XOR 28 XOR 27 XOR 26 XOR 25 XOR 24 |
| SYND1 = | NOT (BP1 XOR 23 XOR 22 XOR 21 XOR 20 XOR 19 XOR 18 XOR 17 XOR 16) |
| SYND2 = | BP2 XOR 15 XOR 14 XOR 13 XOR 12 XOR 11 XOR 10 XOR 9 XOR 8 |
| SYND3 = | NOT (BP3 XOR 7 XOR 6 XOR 5 XOR 4 XOR 3 XOR 2 XOR 1 XOR 0) |
| SYND4 = | BP4 XOR 31 XOR 23 XOR 15 XOR 7 XOR 24 XOR 17 XOR 10 XOR 3 |
| SYND5 = | NOT (BP5 XOR 30 XOR 22 XOR 14 XOR 6 XOR 27 XOR 16 XOR 9 XOR 2) |
| SYND6 = | BP6 XOR 29 XOR 21 XOR 13 XOR 5 XOR 26 XOR 19 XOR 8 XOR 1 |
| SYND7 = | NOT (BP7 XOR 28 XOR 20 XOR 12 XOR 4 XOR 25 XOR 18 XOR 11 XOR 0) |
| SYND8 = | BP8 XOR 27 XOR 19 XOR 11 XOR 3 XOR 31 XOR 20 XOR 13 XOR 6 |
| SYND9 = | NOT (BP9 XOR 26 XOR 18 XOR 10 XOR 2 XOR 30 XOR 23 XOR 12 XOR 5) |
| SYND10 = | BP10 XOR 25 XOR 17 XOR 9 XOR 1 XOR 29 XOR 22 XOR 15 XOR 4 |
| SYND11 = | NOT (BP11 XOR 24 XOR 16 XOR 8 XOR 0 XOR 28 XOR 21 XOR 14 XOR 7) |

The 12 syndrome bits are input into the error detection block 64. The circuitry of block 64 is more fully explained in connection with FIG. 8(a), FIG. 8(b) and FIG. 12. The error detection block 64 detects whether an error has occurred and whether the error is correctable by the present invention. In the preferred embodiment, the function to determine whether an error is present is:

ERROR PRESENT=(SYND0 OR SYND1 OR SYND2 OR SYND3 OR SYND4 OR SYND5 OR SYND6 OR SYND7 OR SYND8 OR SYND9 OR SYND10 OR SYND11)

In other words, if any of the syndrome bits are a 1 it is assumed an error is present.

In order to determine whether or not an error is correctable the following function is used. First, define a function FONE to be a function such that FONE (a,b,c, ... n) is true (logical 1) if, and only if, exactly one of (a,b,c, ... n) is true (logical 1). Then, correctable errors are:

```
{      FONE( SYND0 SYND1 SYND2 SYND3) AND
       FONE( SYND4 SYND5 SYND6 SYND7 ) AND
       FONE( SYND8 SYND9 SYND10 SYND11 ) }
OR
{      NOT ( SYND0 OR SYND1 OR SYND2 OR SYND3 ) AND
       NOT ( SYND4 OR SYND5 OR SYND6 OR SYND7 ) AND
       FONE( SYND8 SYND9 SYND10 SYND11 ) }
OR
{      NOT ( SYND0 OR SYND1 OR SYND2 OR SYND3 ) AND
       NOT ( SYND8 OR SYND9 OR SYND10 OR SYND11 ) AND
       FONE ( SYND4 SYND5 SYND6 SYND7 ) }
OR
{      NOT ( SYND4 OR SYND5 OR SYND6 OR SYND7 ) AND
       NOT ( SYND8 OR SYND9 OR SYND10 OR SYND11 ) AND
       FONE ( SYND0 SYND1 SYND2 SYND3) }
```

Essentially, an error is correctable if one of four conditions has occurred. First, an error is correctable if one and only one syndrome bit in each of three groups of syndrome bits is true. Second, an error is correctable if all syndrome bits in a first group of syndrome bits and in a second group of syndrome bits are 0 and one syndrome bit in a third group of syndrome bits is a 1. Third, a correctable error occurs where all syndrome bits in the first and third groups of syndrome bits are 0 and a single syndrome bit in a second group of syndrome bits is a 1. Last, an error is correctable if all syndrome bits in the second and third groups of syndrome bits are 0 and a single syndrome bit in the first group of syndrome bits is 1.

Line 69 is set to a low state if a correctable error is detected. Line 70 is set to a low state if a non-correctable error is detected. Both line 69 and line 70 are set to a high state if there is no error. The circuit will not allow both line 69 and line 70 to be in a low state simultaneously.

Circuit 63 is used for correction of correctable errors in the preferred embodiment of the present invention. Circuit 63 is more fully described in connection with FIG. 9(a), FIG. 9(b) and FIG. 13. Circuit 63 will accept as input the 12 syndrome bits output from the parity generation circuit 62 and the 32 data bits. The circuit 63 will correct a correctable error if one has occurred and output the data value. If no error has occurred the circuit 63 will output the data value. In either case the data value is output at line 68. Circuit 63 accomplishes this in the preferred embodiment of the present invention by applying the following function:

OUTPUT DATAn=Dn XNOR INPUT DATAn
Where Dn is computed according to the below functions:

| | | |
|---|---|---|
| D0 | = | SYND3 AND SYND7 AND SYND11 |
| D1 | = | SYND3 AND SYND6 AND SYND10 |
| D2 | = | SYND3 AND SYND5 AND SYND9 |
| D3 | = | SYND3 AND SYND4 AND SYND8 |
| D4 | = | SYND3 AND SYND7 AND SYND10 |
| D5 | = | SYND3 AND SYND6 AND SYND9 |
| D6 | = | SYND3 AND SYND5 AND SYND8 |
| D7 | = | SYND3 AND SYND4 AND SYND11 |
| D8 | = | SYND2 AND SYND6 AND SYND11 |
| D9 | = | SYND2 AND SYND5 AND SYND10 |
| D10 | = | SYND2 AND SYND4 AND SYND9 |
| D11 | = | SYND2 AND SYND7 AND SYND8 |
| D12 | = | SYND2 AND SYND7 AND SYND9 |
| D13 | = | SYND2 AND SYND6 AND SYND8 |
| D14 | = | SYND2 AND SYND5 AND SYND11 |
| D15 | = | SYND2 AND SYND4 AND SYND10 |
| D16 | = | SYND1 AND SYND5 AND SYND11 |
| D17 | = | SYND1 AND SYND4 AND SYND10 |
| D18 | = | SYND1 AND SYND7 AND SYND9 |
| D19 | = | SYND1 AND SYND6 AND SYND8 |
| D20 | = | SYND1 AND SYND7 AND SYND8 |
| D21 | = | SYND1 AND SYND6 AND SYND11 |
| D22 | = | SYND1 AND SYND5 AND SYND10 |
| D23 | = | SYND1 AND SYND4 AND SYND9 |
| D24 | = | SYND0 AND SYND4 AND SYND11 |
| D25 | = | SYND0 AND SYND7 AND SYND10 |
| D26 | = | SYND0 AND SYND6 AND SYND9 |
| D27 | = | SYND0 AND SYND5 AND SYND8 |

-continued

```
D28 = SYND0 AND SYND7 AND SYND11
D29 = SYND0 AND SYND6 AND SYND10
D30 = SYND0 AND SYND5 AND SYND9
D31 = SYND0 AND SYND4 AND SYND8
```

Note that applying this formula will cause INPUT DATAn to be equal to OUTPUT DATAn in all cases where any single syndrome bit used to generate Dn is 0. If all syndrome bits used to generate Dn are 1 the function will invert DATAn to produce OUTPUT DATAn. Assuming that circuit 64 has determined this is a correctable error this function will have inverted the single bit that was in error.

The preferred embodiment of the present invention depends on data being organized in the memory circuits as shown in FIG. 6. Each memory circuit 30-40 is capable of outputting 4 bits at one time. The memory circuits 43 contain data bits and the memory circuits 44 contain parity check bits. One rule used in organizing information and memory circuits in the present invention is that no single memory circuit may have both data and parity bits on it. In the preferred embodiment, circuit 30 may output data bits 0, 8, 16 and 24. Circuit 31 may output data bits 1, 9, 17 and 25, etc. Circuit 38 may output check bits 0, 1, 2 and 3. Circuit 39 may output check bits 4, 5, 6 and 7. Circuit 40 may output check bits 8, 9, 10 and 11. This information on how data bits and check bits are arranged on the memory chips in the preferred embodiment is illustrated in the table below.

| CHIP | DATA BITS |
|------|-----------|
| 0 | 0, 8, 16, 24 |
| 1 | 1, 9, 17, 25 |
| 2 | 2, 10, 18, 26 |
| 3 | 3, 11, 19, 27 |
| 4 | 4, 12, 20, 28 |
| 5 | 5, 13, 21, 29 |
| 6 | 6, 14, 22, 30 |
| 7 | 7, 15, 23, 31 |

| CHIP | CHECK BITS |
|------|------------|
| 8 | 0, 1, 2, 3 |
| 9 | 4, 5, 6, 7 |
| 10 | 8, 9, 10, 11 |

FIG. 10 illustrates the circuitry used by the parity generator 60 from FIG. 4. Each of the circuits 100–111 corresponds with the function for computing byte parity bits, BP0–BP11 disclosed above in connection with FIG. 4. Circuit 100 will be more fully described in connection with FIG. 5(a) and circuit 101 will be more fully described in connection with FIG. 5(b). It will be obvious to one skilled in the art that circuits 102–111 follow a similar pattern to circuits 100 and 101. It is appreciated that, although the preferred embodiment of the present invention utilizes Exclusive OR gates, it is possible to implement the same function using other gates. The use of Exclusive OR gates is designed to generate a parity bit which will make the parity of a word comprised of the inputs to the Exclusive OR gates and the resulting output bit even. Other circuitry could be substituted for the circuitry presented. Further, it is appreciated that a scheme using odd parity may be developed without departing from the spirit of the present invention. In the preferred embodiment a signal BAD/I is utilized for testing and normally tied to a low signal.

FIG. 5(a) illustrates the circuitry used by the preferred embodiment of the present invention to implement the function for generating byte parity bit 0 (BP0). In this circuit and all circuits described in the specification, the Exclusive OR gates follow the truth table below:

| B | C | A | OUT |
|---|---|---|-----|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

XOR gate 76 uses as inputs data bit 28 on line 81, data bit 29 on line 82, and a third bit on line 80a which may be used during testing of the circuitry to generate a bad parity bit. The Exclusive OR gate 77 uses as input data bit 31 on line 83, data bit 26 on line 84 and data bit 27 on line 85. The Exclusive OR gate 78 uses as input data bit 30 on line 86, data bit 24 on line 87 and data bit 25 on line 88. The outputs from Exclusive OR gates 76, 77 and 78 are used as input to Exclusive OR gate 79. The output of Exclusive OR gate 79 is output onto line 97 and corresponds with BP0.

FIG. 5(b) illustrates the circuitry used by the preferred embodiment of the present invention to generate BP1. Exclusive OR gate 71 has as inputs line 80b which may be used to generate bad parity for testing of the circuit, data bit 23 on line 89 and data bit 18 on line 90. The Exclusive OR gate 72 has as inputs data bit 21 on line 91, data bit 22 on line 92 and data bit 17 on line 93. The Exclusive OR gate 73 has as inputs data bit 20 on line 94, data bit 19 on line 95 and data bit 16 on line 96. The outputs of the Exclusive OR gates 71, 72 and 73 are used as inputs to the Exclusive OR gate 74. The output of the Exclusive OR gate 74 is inverted and output on line 98 and corresponds with BP1.

FIG. 11 illustrates the circuitry used to generate the syndrome bits when the data is read from the memories. The circuitry of FIG. 11 corresponds with block 62 in FIG. 4. In FIG. 11 circuits 120–131 are used to generate syndrome bits, SYND0 through SYND11, respectively. Circuits 120 and 121 are described in more detail in connection with FIG. 7(a) and FIG. 7(b), respectively. The workings of the remaining circuits 122–131 will be obvious to one of ordinary skill in the art from the descriptions of circuits 120 and 121.

FIG. 7(a) shows the circuitry used to generate syndrome bit 0 in accordance with the equation disclosed above in connection with FIG. 4. This circuitry consists of four Exclusive OR gates. Exclusive OR gate 141 has as inputs BP0 on line 132, data bit 28 on line 133 and data bit 29 on line 134. Exclusive OR gate 142 has as inputs data bit 31 on line 135, data bit 26 on line 136 and data bit 27 on line 137. The Exclusive OR gate 143 has as inputs data bit 30 on line 138, data bit 24 on line 139 and data bit 25 on line 140. The outputs from the Exclusive OR gates 141, 142 and 143 are used as inputs to Exclusive OR gate 144. The result of Exclusive OR gate 144 is output on line 145 and is syndrome bit 0.

FIG. 7(b) illustrates the circuitry used to generate syndrome bit 1 in accordance with the formula disclosed above in connection with FIG. 4. Again, four Exclusive OR gates are used. Exclusive OR gate 155 has as inputs BP1 on line 146, data bit 23 on line 147 and data bit 18 on line 148. Exclusive OR gate 156 has inputs data bit 21 on line 149, data bit 22 on line 150 and data bit 17 on line 151. Exclusive OR gate 157 has as inputs data bit 20 on line 152, data bit 19 on line 153 and data bit 16 on line 154. The outputs from the Exclusive OR gates 155, 156 and 157 are used as inputs to the Exclusive OR gate 158. The output of Exclusive OR gate 158 is inverted and output onto line 159 as syndrome 1.

FIG. 12 illustrates the circuitry used in the preferred embodiment of the present invention to determine whether an error has occurred and to determine whether the error is a correctable error or noncorrectable error. This circuitry was previously discussed in connection with FIG. 4, block 64 and is used to implement the function for determining whether a correctable error has occurred which was disclosed above. The circuitry may be viewed as two separate logical units. The circuitry in box 160 is used to generate the FONE functions and the NOT (SYNDn OR SYNDn+1 OR SYNDn+2 OR SYNDn+3) functions as disclosed in connection with FIG. 4. Block 161 discloses the circuitry used to test for the four legal correctable error conditions.

FIG. 8(a) further describes the circuitry in box 160 of FIG. 12. Syndrome bit 0 is input on line 168, syndrome bit 1 on line 169, syndrome bit 2 on line 170 and syndrome bit 3 on line 171 into circuit 162. Circuit 162 outputs value AONE on line 172. The value of AONE is true (a logical 1) if and only if exactly one of lines 168-171 have a value of true (logical 1), otherwise AONE has a value of false (logical 0). Syndrome bits 0-3 are also input on lines 168-171 to NOR gate 165. The output from NOR gate 165 is inverted and output onto line 173 as value AZERO. Circuit 163 and NOR gate 166 work in a similar fashion for syndrome bits 4-7. Circuit 164 and NOR gate 167 work in a similar fashion for syndrome bits 8-11.

FIG. 8(b) is illustrative of the circuitry used to detect the four conditions which are correctable errors. In addition, this circuitry will indicate if no error has occurred. NAND gate 174 will have as its output a 0 if all syndrome bits are 0. This indicates there is no error. If any syndrome bit is a 1 the output of the NAND gate 174 will be a 1 indicating an error has occurred. In the case of no error, the output of the NAND gate 174 (a 0) is used as an input to NAND gates 180 and 181. This will cause the outputs of the both of these NAND gates 180 and 181 to be a 1 indicating no error has occurred.

If an error has occurred and, therefore, the output from NAND gate 174 is a 1 the outputs of NAND gates 180 and 181 will be influenced by the four inputs to NAND gates 175-178. Each of these NAND gates 175-178 corresponds with the correctable error conditions discussed above in connection with FIG. 4. For example, the output from NAND gate 175 will be a 0 if one and only one of syndrome bits SYND0, SYND1, SYND2 AND SYND3 is a 1 and one and only one of syndrome bits SYND4, SYND5, SYND6 AND SYND7 is a 1 and one and only one of syndrome bits SYND8, SYND9, SYND10 AND SYND11 is a 1. The outputs from the NAND gates 175-178 are inverted and used as inputs to the NOR gate 179. Therefore, if the output of NAND gate 175 is a 0 it would be inverted to a 1 and force the output of OR gate 179 to be a 1. This value is inverted and used as an input to NAND gate 181. Assuming the output from NAND gate 174 is a 1 indicating an error has occurred, the output of NAND gate 181 will be a 1. The output from gate 179 is also used as input to NAND gate 180. Thus, if the output of gate 179 is a 1 and the output of gate 174 is a 1, the output of gate 180 will be a 0. A zero on line 69 indicates a correctable error condition has occurred. It will be obvious to one of ordinary skill in the art that the remaining NAND gates 176-178 implement the other three correctable error condition functions. If the outputs from any of these gates 176-178 are a 0 the resulting output on line 70 will be a 0 following the same analysis described for the output of gate 175.

If a non-correctable error condition has occurred the outputs of NAND gates 175-178 will all be one. These will be inverted and used as inputs to OR gate 179 and, therefore, the output from OR gate 179 will be a 1. In this case, assuming an error has occurred and the output from NAND gate 174 is a 1, the output of NAND gate 180 on line 70 will be a 0 indicating a noncorrectable error has occurred.

In summary, if lines 69 and 70 are both in a high state (indicating a logical 1) no error has occurred. If line 70 is in a low state (a logical 0) it indicates a non-correctable error has occurred. If line 69 is in a low state it indicates a correctable error has occurred. Finally, it is not possible for both line 69 and line 70 to be low simultaneously.

FIG. 13 illustrates the circuitry used by the preferred embodiment to implement the functions for computing D0-D31 as disclosed above in connection with FIG. 4. The circuitry in box 185 will be discussed in more detail in connection with FIG. 9(a). It will be obvious to one with ordinary skill in the art, based on the discussion of FIG. 9(a), the workings of the remaining circuitry disclosed in FIG. 13.

FIG. 9(a) illustrates the circuit used to compute the function D0 as disclosed above in connection with FIG. 4. D0 is computed by using as inputs to NAND gate 189 syndrome bit 3 on line 186, syndrome bit 7 on line 187 and syndrome bit 11 on line 188. The output of NAND gate 189, D0 on line 190 is a zero if each of the syndrome bits used as input were 1. In all other cases the output of the NAND gate 189 is a 1. In the case of a correctable error being indicated as discussed above in connection with FIG. 8(a), FIG. 8(b) and FIG. 12 a 0 on line 190 indicates that bit 0 is inverted. This is corrected by the circuitry disclosed in FIG. 9(b).

The circuitry disclosed in FIG. 9(b) shows an Exclusive OR gate 193 having as inputs the data input from the memory on line 191 and the result of the circuits shown in FIG. 13 on line 192. The output of the Exclusive OR gate 193 on line 194 is the correct data in the case of a correctable error or in the case of no error occurring in the memories. For example, if the input from memory for bit 0 on line 191 is a 0 and the output from the NAND gate 189 in FIG. 9a which is input on line 192 into the Exclusive OR gate 193 is a 0 the output of the Exclusive OR gate will be inverted and the output on line 194 for bit 0 will be a 1. In general, an output from any of the NAND gates shown in FIG. 13 which is a 0 will cause the corresponding input bit to be inverted and an output from any of the NAND gates shown in FIG. 13 which is a 1 will cause the data input from the memory to remain in the same state. This circuitry effectively implements the equation for correct data disclosed in FIG. 4.

Thus, a method and apparatus for detecting and correcting errors in binary coded information is disclosed. The method will detect and correct any single bit error and will detect double bit errors or single chip failures in a memory circuit.

I claim:

1. A method for detecting errors in binary coded information, comprising the steps of:
receiving a plurality of information code elements; grouping said information code elements; generating a first plurality of parity codes based on said groups of information code elements;
storing said information and said parity codes in a plurality of circuits;
said information code elements being stored in circuits separate from said parity code elements;
receiving said information code elements and said parity code elements from said circuits;
generating a second plurality of parity code elements based on said information code elements and said first plurality of parity code elements;
determining, based on said second plurality of parity code elements, whether one of said information code elements has changed state since said information code elements were received by said circuits;
said information code elements grouped such that for a first predetermined number of parity codes elements there is either a single of said information code elements or none of said information code elements which effects each of said first predetermined number of parity code elements,
said change in state indicating an error in said binary coded information.

2. In the method recited in claim 1, said grouping of information code elements such that for a second predetermined number of parity codes none of said information code elements affects each of said second predetermined number of parity codes.

3. In the method recited in claim 2, said grouping of information code elements such that any single of said information code elements affects the value of a third predetermined number of said parity codes.

4. The method, as recited in claim 3, wherein generating of said first plurality of parity codes comprises generating a first parity code element representative of a parity code value for each of said groups of information code elements.

5. The method, as recited in claim 4, wherein generation of said second plurality of parity code elements comprises the step generating a second parity code element for each of said groups of information code elements; said second parity code element representative of a parity code value for said group of information code elements and said first parity code element.

6. The method, as recited in claim 5, wherein a first predetermined set of said first plurality of parity code elements are inverted before being stored.

7. The method, as recited in claim 6, wherein a predetermined set of said second plurality of parity code elements are inverted before being used to determine whether one of said information code elements or one of said parity code elements has changed state.

8. The method, as recited in claim 7, wherein said determination of whether one of said information code elements has changed state comprises the steps of:
grouping said second plurality of parity codes into a plurality of groups;
determining whether:
(a) a single of said second plurality of parity codes in each of said groups of second plurality of parity codes is in a first predetermined state;
(b) a single of a first of said groups of second plurality of parity codes is in said first predetermined state and each of the remaining of said second plurality of parity codes is in a second predetermined state;
either of condition (a) or condition (b) indicating a change in state of one of said information code elements or one of said parity code elements has occurred.

9. The method, as recited in claim 8, further comprising the step of correcting the one of said information code elements which has changed state.

10. The method, as recited in claim 9, wherein correction of the one of said information code elements which has changed state comprises the steps of:
grouping said second plurality of parity codes into a plurality of groups of parity codes having said third predetermined number in each of said group;
for each of said groups:
(a) determining if all of said second parity codes are in a third predetermined state;
(b) if all of said second parity codes are in said third predetermined state, causing the state of a first data value to be in said third predetermined state;
(c) if all of said second parity codes are not in said third predetermined state, causing the state of said first data value to be in a fourth predetermined state;
(d) performing an Exclusive OR function using as inputs said information elements received from said circuit and said first data value, the result being a second data value;
(e) said second data value being the corrected data value repeating steps (a) through (e) for each of said groups.

11. The method, as recited in claim 10, further comprising the step of determining whether a noncorrectable error has occurred.

12. The method, as recited in claim 11, wherein non-correctable errors comprise errors in which a single of said circuits have failed.

13. The method, as recited in claim 12, wherein non-correctable errors further comprise errors in which two of said information code elements or said first plurality of parity code elements are inverted.

14. The method, as recited in claim 13, wherein determination of whether a non-correctable error has occurred comprises the steps of:
(a) determining whether one or more of said second plurality of parity codes is in said first predetermined state;
(b) determining whether a correctable error has occurred;
wherein, if condition (a) has occurred and condition (b) has not occurred, a non-correctable error has occurred.

15. The method, as recited in claim 14, wherein said first predetermined number is three.

16. The method, as recited in claim 15, wherein said second predetermined number is four.

17. The method, as recited in claim 16, wherein said third predetermined number is three.

18. The method, as recited in claim 17, wherein said first predetermined state is a high electrical state.

19. The method, as recited in claim 18, wherein said second predetermined state is a low electrical state.

20. The method, as recited in claim 19, wherein said third predetermined state is a high electrical state.

21. The method, as recited in claim 20, wherein said fourth predetermined state is a low electrical state.

22. The method, as recited in claim 21, wherein said first plurality of parity code values utilize an even parity scheme.

23. The method, as recited in claim 22, wherein said second plurality of parity code values utilize an even parity scheme.

24. An improved method for detecting and correcting errors in binary coded information, said method detecting and correcting all single bit errors in an information word, said method further detecting all two-bit errors and detecting inversion of any number of bits received from a single circuit, said method comprising the steps of:
   receiving a plurality of binary codes comprising an information word;
   grouping said plurality of binary codes;
   generating a parity code for each of said groups of binary codes;
   said plurality of binary codes being grouped such that for any three of said parity codes there is either a single of said binary codes or none of said binary codes which affects each of said three parity codes;
   said plurality of binary codes further being grouped such that for any four of said parity codes none of said binary codes affects each of said four parity codes;
   said plurality of binary codes further being grouped such that any single of said binary codes affects the value of three of said parity codes;
   said plurality of binary codes being stored in a first plurality of circuits and said parity codes being stored in at least one second circuit;
   said plurality of binary codes further being grouped on said circuits such that any single of said binary codes affects no more than three of said parity code elements;
   receiving said plurality of binary codes and said parity codes from said first plurality of circuits and said at least one second circuit;
   generating syndrome codes based on said plurality of binary codes and said parity codes wherein one of said syndrome codes is generated for each group of binary codes; said syndrome codes representative of a parity value for said group of binary codes and a parity code;
   grouping said syndrome codes into a plurality of groups;
   determining whether:
      (a) a single of said syndrome codes in each of said groups of syndrome codes is in a first predetermined state;
      (b) a single of a first of said groups of syndrome codes is in a first predetermined state and each of the remaining of said syndrome codes is in a second predetermined state;
   either condition (a) or condition (b) indicating a correctable error has occurred;
   determining whether:
      (c) a non-correctable error has occurred by examining whether one or more of said syndrome codes is in said first predetermined state and whether
   a correctable error has occurred.

25. The method as recited in claim 24, further comprising the step of correcting correctable errors, said correction of correctable errors comprising the steps of:
   grouping said syndrome codes into a plurality of groups, each group of syndrome codes having three syndrome codes in it;
   for each of said groups of syndrome codes;
      (a) determining if all of said syndrome codes are in a third predetermined state;
      (b) if all of said syndrome codes are in said third predetermined state, causing the state of a first data value to be in said third predetermined state;
      (c) if all of said syndrome codes are not in said third predetermined state, causing the state of said first data value to be in a fourth predetermined state;
      (d) performing an Exclusive OR function using as inputs said binary codes received from said circuit and said first data value, the result being a second data value;
      (e) said second data value being the corrected data value;
   preforming steps (a) through (e) for each of said groups.

26. The method, as recited in claim 25, wherein said parity values of said plurality of parity codes utilize an even parity scheme.

27. The method, as recited in claim 27, wherein said parity values of said syndrome bits utilize an even parity scheme.

28. The method, as recited in claim 25, wherein a predetermined set of said plurality of parity codes are inverted before being stored in said at least one second circuit.

29. The method, as recited in claim 25, wherein said first predetermined state is a high electrical state.

30. The method, as recited in claim 29, wherein said second predetermined state is a low electrical state.

31. The method, as recited in claim 30, wherein said third predetermined state is a high electrical state.

32. The method, as recited in claim 31, wherein said fourth predetermined state is a low electrical state.

33. A method for detecting and correcting errors in binary coded information, comprising the steps of:
   receiving a plurality of information code elements;
   grouping said information code elements;
   generating a first set of parity code elements, each of said information code elements being associated with at least three of said parity code elements;
   generating a second set of elements parity code elements based on said information code elements and said first set of parity code elements;
   determining, based on said second set of parity code elements, whether one of said information code elements has changed state.

* * * * *